US012671283B2

(12) United States Patent
Kim et al.

(10) Patent No.: US 12,671,283 B2
(45) Date of Patent: Jun. 30, 2026

(54) FLUX-CONCENTRATED MOTOR

(71) Applicant: LG ELECTRONICS INC., Seoul (KR)

(72) Inventors: Jaeho Kim, Seoul (KR); Hongsik Hwang, Seoul (KR); Younggeun Min, Seoul (KR); Jiwan Lee, Seoul (KR); Kyungho Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 18/726,194

(22) PCT Filed: Jan. 6, 2023

(86) PCT No.: PCT/KR2023/000308
§ 371 (c)(1),
(2) Date: Jul. 2, 2024

(87) PCT Pub. No.: WO2024/048870
PCT Pub. Date: Mar. 7, 2024

(65) Prior Publication Data
US 2025/0149940 A1 May 8, 2025

(30) Foreign Application Priority Data
Aug. 30, 2022 (KR) ........................ 10-2022-0109044

(51) Int. Cl.
*H02K 1/27* (2022.01)
*H02K 1/276* (2022.01)
(Continued)

(52) U.S. Cl.
CPC ......... *H02K 1/2773* (2013.01); *H02K 11/215* (2016.01); *H02K 21/16* (2013.01);
(Continued)

(58) Field of Classification Search
CPC ............ H02K 1/26; H02K 1/246; H02K 3/04; H02K 3/12; H02K 3/15; H02K 19/103;
(Continued)

(56) References Cited

U.S. PATENT DOCUMENTS

| | | | | |
|---|---|---|---|---|
| 2,913,607 A | * | 11/1959 | Douglas | H02K 19/14 |
| | | | | 310/216.107 |
| 6,121,706 A | * | 9/2000 | Nashiki | H02K 1/246 |
| | | | | 310/216.106 |

(Continued)

FOREIGN PATENT DOCUMENTS

| | | |
|---|---|---|
| CN | 107394927 | 11/2017 |
| CN | 209283062 | 8/2019 |

(Continued)

OTHER PUBLICATIONS

International Search Report dated May 22, 2023 issued in Application No. PCT/KR2023/000308.

(Continued)

*Primary Examiner* — Maged M Almawri
(74) *Attorney, Agent, or Firm* — KED & ASSOCIATES, LLP

(57) ABSTRACT

A flux-concentrated motor according to an embodiment of the present specification comprises: a flux-concentrated rotor having multiple arc-type permanent magnets embedded therein, each arc-type permanent magnet comprising an inner diameter portion formed with a first curvature, an outer diameter portion formed with a second curvature, and a connecting portion for connecting an end of the inner diameter portion to an end of the outer diameter portion; and a printed circuit board having a Hall sensor for identifying the position of the arc-type permanent magnets. In a state in which the flux-concentrated rotor is D-axis aligned, the Hall sensor is positioned on a pitch circle diameter (PCD) of the Hall sensor in a position shifted from the D-axis by a first (Continued)

mechanical angle, and the first mechanical angle is the sum of second and third mechanical angles. The second mechanical angle refers to an angle of movement to be made by a Hall sensor in order to satisfy a reference electric angle in connection with a flux-concentrated motor comprising a flux-concentrated rotor having multiple bar-type permanent magnets embedded therein and having the same number of poles and PCD as the above flux-concentrated rotor. The third angle refers to an angle between the D-axis and a point of intersection between the PCD of the Hall sensor and a first virtual line connecting transverse centers of the arc-type permanent magnets in the longitudinal direction of the arc-type permanent magnets.

20 Claims, 14 Drawing Sheets

(51) Int. Cl.
| | |
|---|---|
| *H02K 11/215* | (2016.01) |
| *H02K 21/16* | (2006.01) |
| *H02K 29/03* | (2006.01) |

(52) U.S. Cl.
CPC .......... *H02K 29/03* (2013.01); *H02K 2211/03* (2013.01); *H02K 2213/03* (2013.01)

(58) Field of Classification Search
CPC ...... H02K 17/16; H02K 17/165; H02K 17/18; H02K 17/185; H02K 17/20; H02K 17/205; H02K 2213/03; H02K 1/27; H02K 1/276; H02K 1/2766; H02K 1/2773; H02K 1/28; H02K 1/2706; H02K 1/2713; H02K 1/272; H02K 1/2726; H02K 1/2733; H02K 29/03; H02K 2211/03
USPC ........................................ 310/156.01–156.84
See application file for complete search history.

(56) References Cited

U.S. PATENT DOCUMENTS

| | | | | |
|---|---|---|---|---|
| 6,177,745 | B1 * | 1/2001 | Narita | H02K 1/2766 310/156.43 |
| 6,218,753 | B1 * | 4/2001 | Asano | H02K 1/276 310/156.53 |
| 8,089,190 | B2 * | 1/2012 | Lee | H02K 1/276 310/156.53 |
| 8,749,109 | B2 * | 6/2014 | Lendenmann | H02K 1/246 310/216.106 |
| 8,803,394 | B2 * | 8/2014 | Sano | H02K 1/2766 310/216.106 |
| 8,860,275 | B2 * | 10/2014 | Kaiser | H02K 1/2766 310/156.56 |
| 9,893,581 | B2 * | 2/2018 | Kikuchi | B60L 50/61 |
| 10,020,698 | B2 * | 7/2018 | Kondou | H02K 1/276 |
| 10,063,117 | B2 * | 8/2018 | Nakayama | H02K 3/28 |
| 10,277,083 | B2 * | 4/2019 | Ronchetto | H02K 1/22 |
| 10,516,307 | B2 * | 12/2019 | Gieras | H02K 1/2706 |
| 10,622,853 | B2 * | 4/2020 | Toda | H02K 23/405 |
| 10,715,017 | B2 * | 7/2020 | Gieras | H02K 1/2746 |
| 10,720,805 | B2 * | 7/2020 | Mochida | H02K 1/28 |
| 10,742,080 | B2 * | 8/2020 | Hsu | H02K 3/12 |
| 10,770,960 | B2 * | 9/2020 | Xiao | H02K 29/03 |

| | | | | |
|---|---|---|---|---|
| 11,056,939 | B2 * | 7/2021 | Sugiura | H02K 21/14 |
| 11,128,185 | B2 * | 9/2021 | Zhang | H02K 15/03 |
| 11,139,704 | B2 * | 10/2021 | Sakamoto | H02K 1/24 |
| 11,251,665 | B2 * | 2/2022 | Hu | H02K 3/487 |
| 11,575,285 | B2 * | 2/2023 | Krizan | H02K 1/276 |
| 11,689,071 | B2 * | 6/2023 | Hu | H02K 1/276 310/156.56 |
| 12,095,311 | B2 * | 9/2024 | Hu | H02K 29/03 |
| 12,170,462 | B2 * | 12/2024 | Takahashi | H02K 3/34 |
| 12,176,778 | B2 * | 12/2024 | Takahashi | H01F 5/06 |
| 12,266,976 | B2 * | 4/2025 | Hu | H02K 1/276 |
| 12,362,620 | B2 * | 7/2025 | Takahashi | H02K 3/522 |
| 12,451,739 | B2 * | 10/2025 | Takahashi | H02K 21/22 |
| 12,483,102 | B2 * | 11/2025 | Itasaka | H02K 1/2766 |
| 12,519,353 | B2 * | 1/2026 | Saito | H02K 1/276 |
| 12,537,400 | B2 * | 1/2026 | Druant | H02K 1/148 |
| 2002/0070620 | A1 * | 6/2002 | Naito | H02K 1/2766 310/156.56 |
| 2007/0108853 | A1 * | 5/2007 | Shah | H02K 1/246 310/216.054 |
| 2007/0152527 | A1 * | 7/2007 | Yura | H02K 1/246 310/156.53 |
| 2009/0189470 | A1 * | 7/2009 | Mcclellan | H02K 53/00 310/156.43 |
| 2012/0267977 | A1 * | 10/2012 | Merwerth | H02K 1/2766 310/156.53 |
| 2013/0320796 | A1 * | 12/2013 | Vyas | H02K 1/2766 310/156.43 |
| 2013/0320797 | A1 * | 12/2013 | Vyas | H02K 1/2766 310/156.43 |
| 2014/0346911 | A1 * | 11/2014 | Tsuchida | H02K 1/246 310/156.53 |
| 2015/0015093 | A1 * | 1/2015 | Gontermann | H02K 1/246 310/46 |
| 2015/0115758 | A1 * | 4/2015 | Koka | H02K 21/14 318/139 |
| 2015/0171684 | A1 * | 6/2015 | McClelland | H02K 1/2766 310/156.07 |
| 2016/0126792 | A1 * | 5/2016 | Yamaguchi | H02K 1/2766 310/43 |
| 2016/0285327 | A1 * | 9/2016 | Sasaki | H02K 1/246 |
| 2016/0336823 | A1 * | 11/2016 | Kikuchi | H02K 1/246 |
| 2017/0187256 | A1 * | 6/2017 | Zhang | H02K 1/2766 |
| 2017/0310171 | A1 * | 10/2017 | Reddy | H02K 1/146 |
| 2017/0317540 | A1 * | 11/2017 | Laldin | H02K 1/2766 |
| 2019/0109527 | A1 * | 4/2019 | Takahashi | H02K 19/10 |
| 2020/0161939 | A1 | 5/2020 | Takahashi et al. | |
| 2022/0131433 | A1 * | 4/2022 | Hirano | H02K 1/2766 |
| 2023/0198322 | A1 * | 6/2023 | Tremelling | H02K 19/103 310/46 |

FOREIGN PATENT DOCUMENTS

| | | |
|---|---|---|
| CN | 210258681 | 4/2020 |
| JP | 2014-230348 | 12/2014 |
| JP | 2021-184700 | 12/2021 |
| KR | 10-2010-0068848 | 6/2010 |
| KR | 10-2014-0022913 | 2/2014 |
| KR | 10-2017-0075660 | 7/2017 |
| KR | 10-2021-0109272 | 9/2021 |
| KR | 10-2021-0132976 | 11/2021 |

OTHER PUBLICATIONS

Korean Notice of Allowance issued in Application No. 10-2022-0109044 dated May 22, 2024.

* cited by examiner

【FIG. 1】
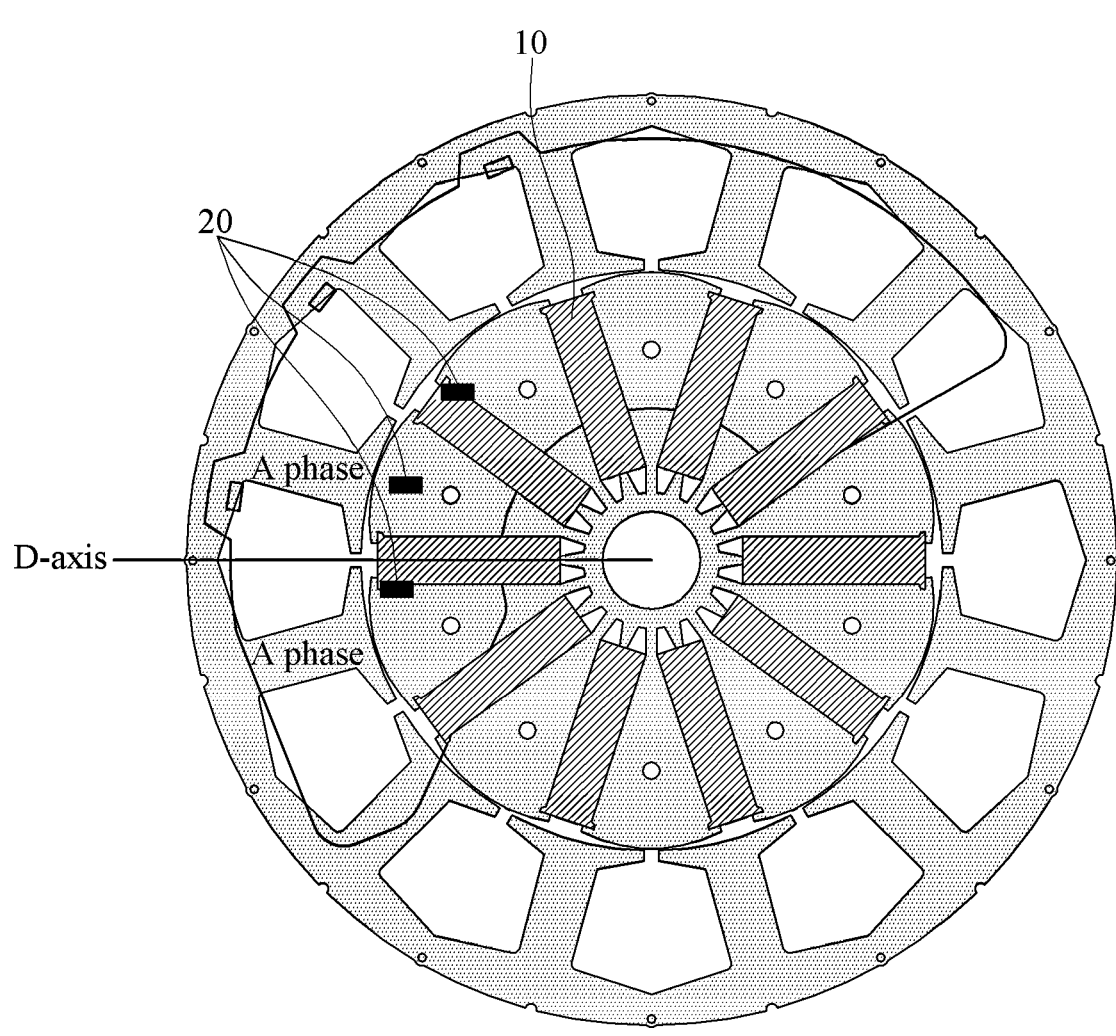

【FIG. 2】
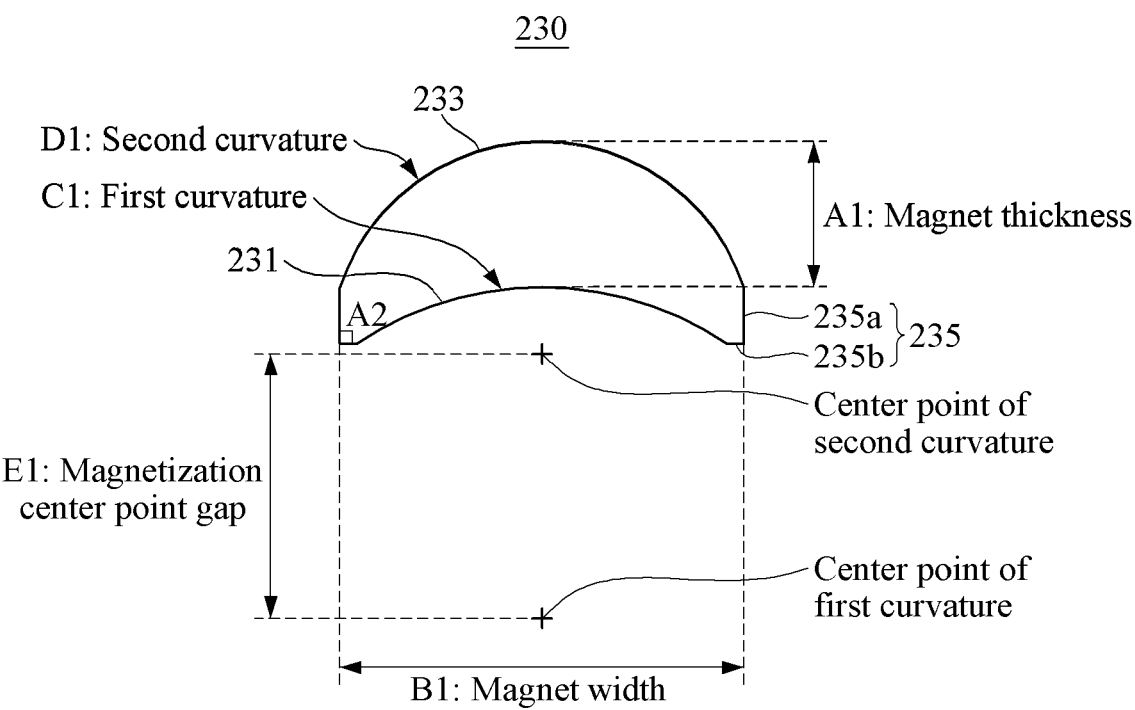
【FIG. 3】
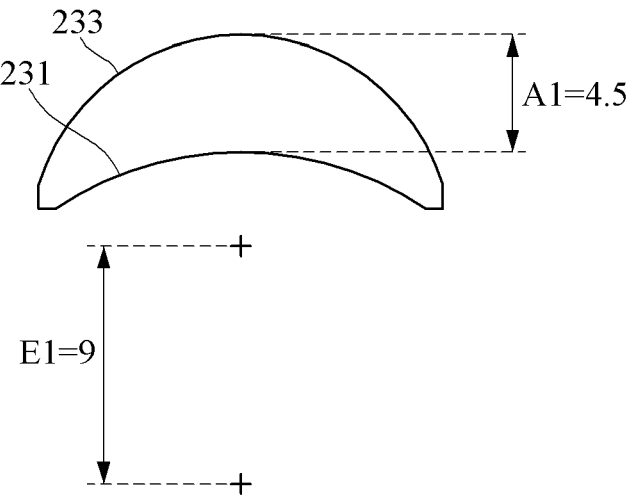

【FIG. 4】
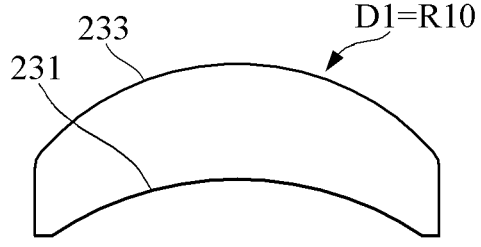
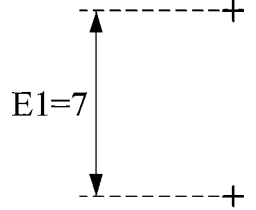
【FIG. 5】
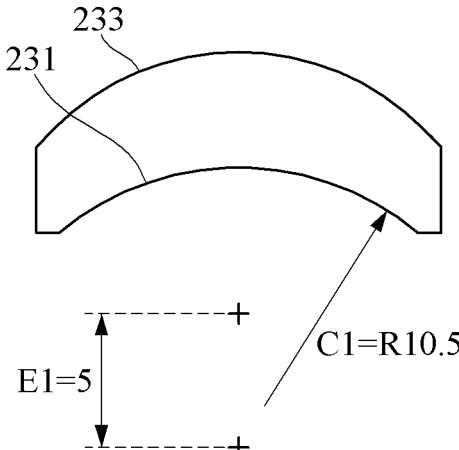

【FIG. 6】
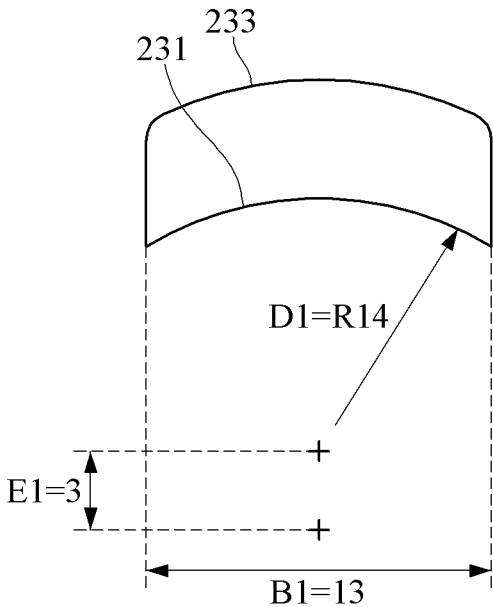
【FIG. 7】
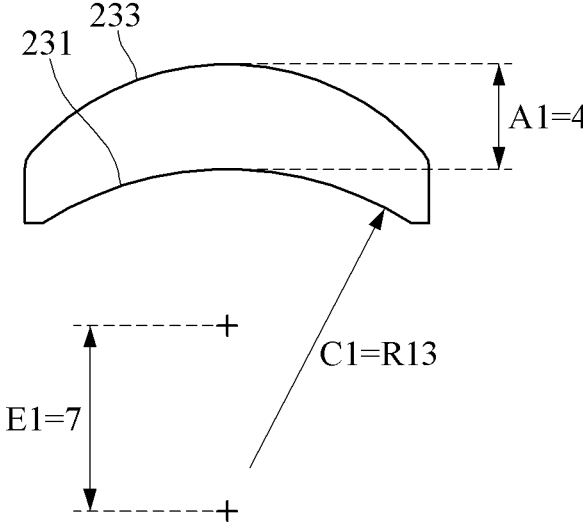

【FIG. 8】
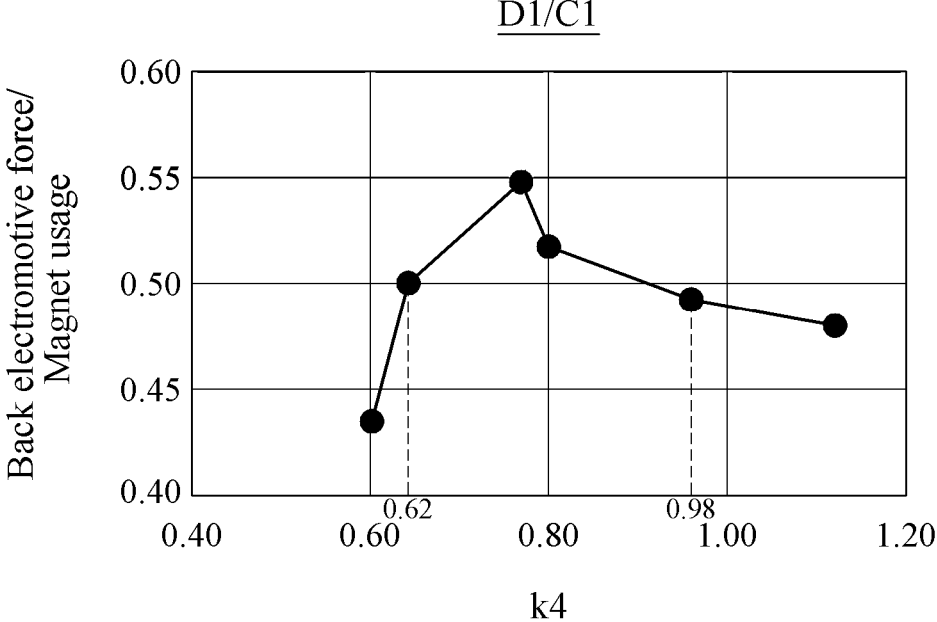
【FIG. 9】
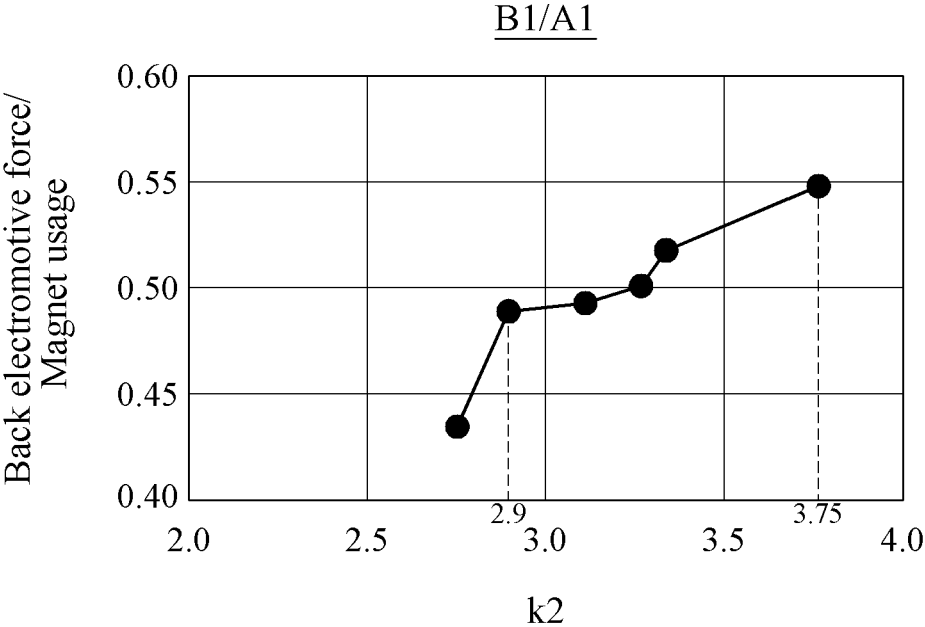

【FIG. 10】
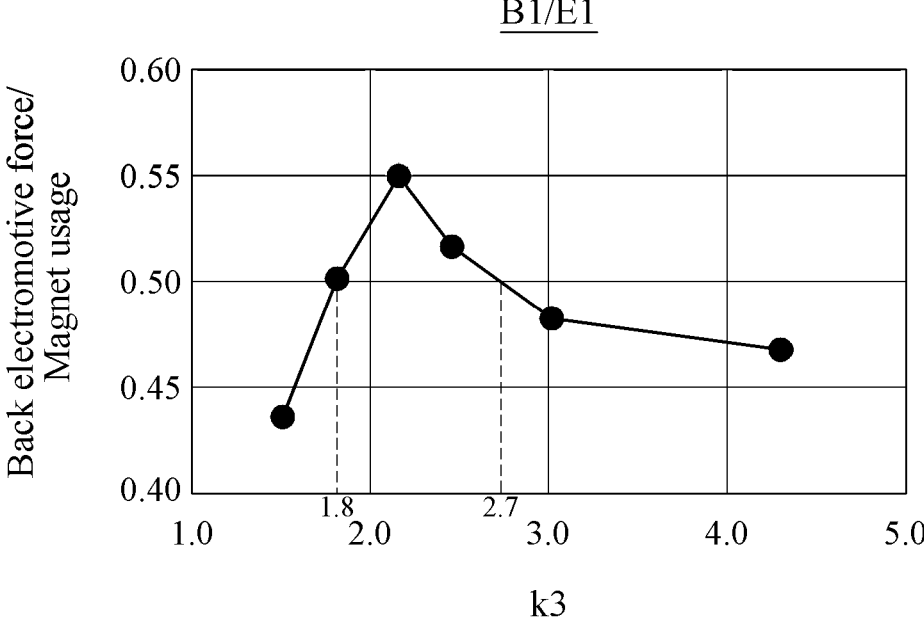
【FIG. 11】
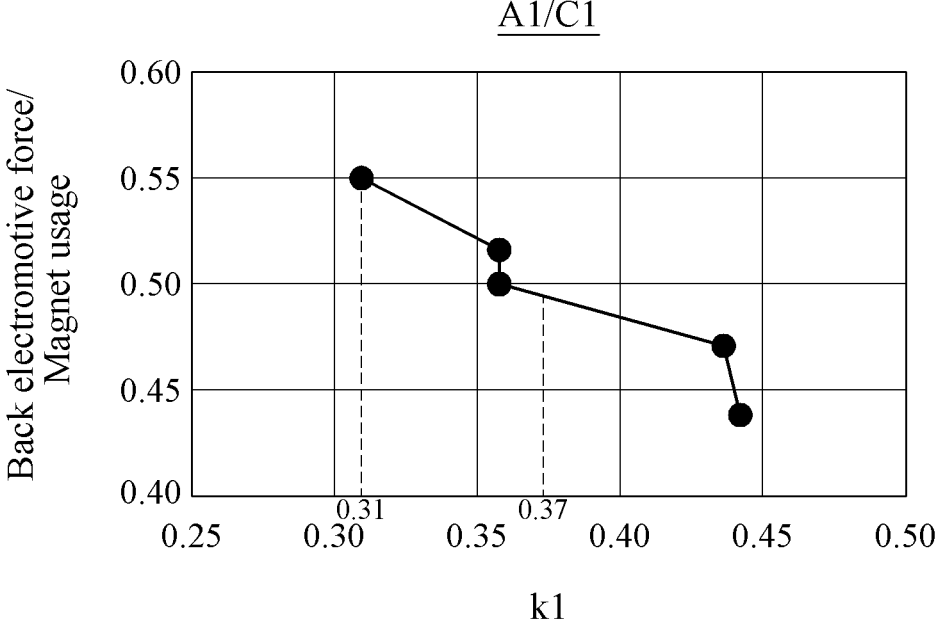

【FIG. 12】
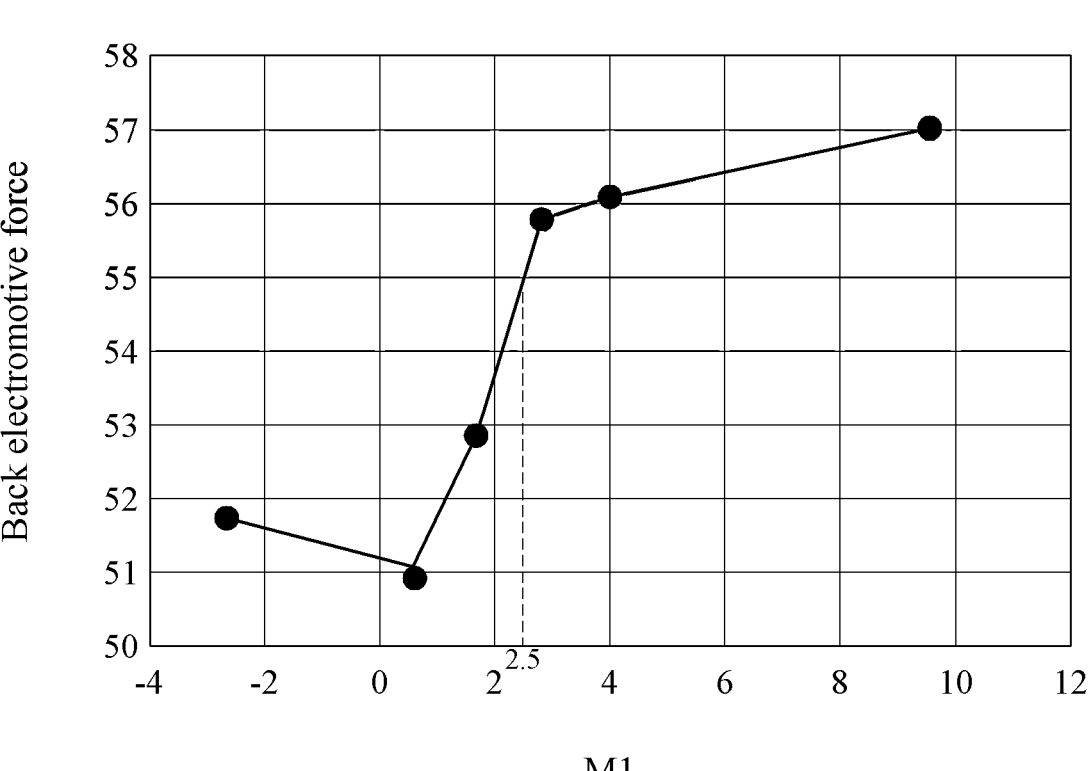

【FIG. 13】
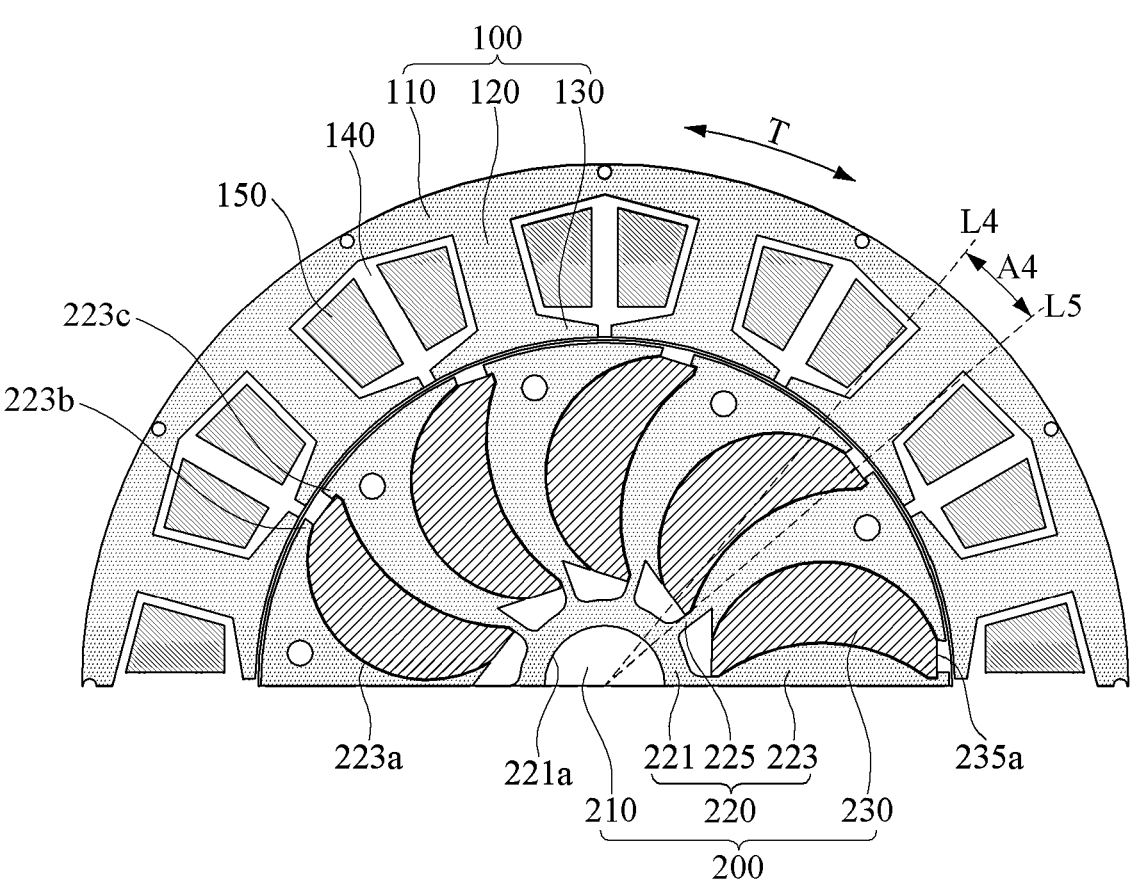

【FIG. 14】
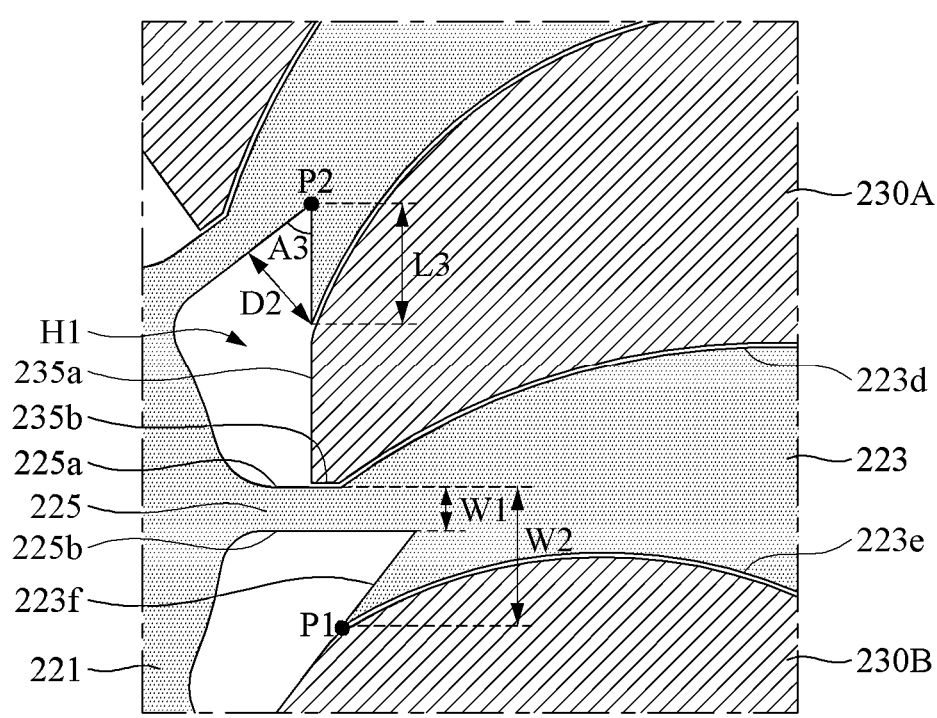

【FIG. 15】
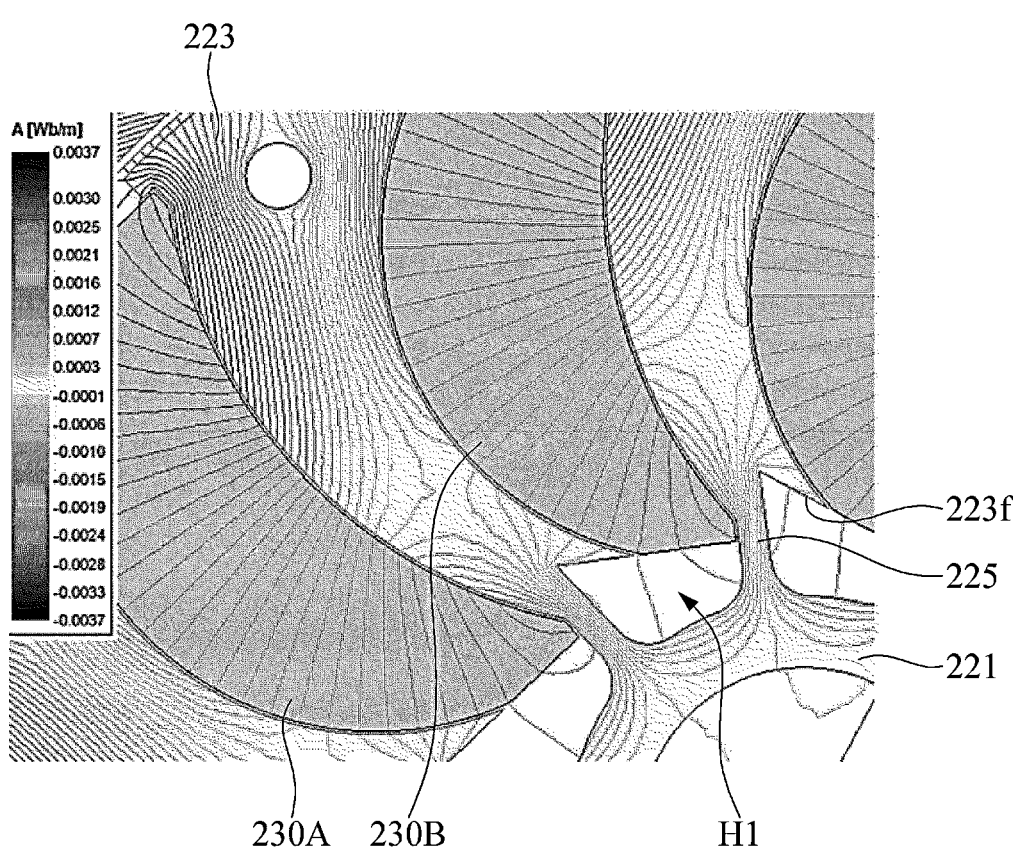

【FIG. 16】
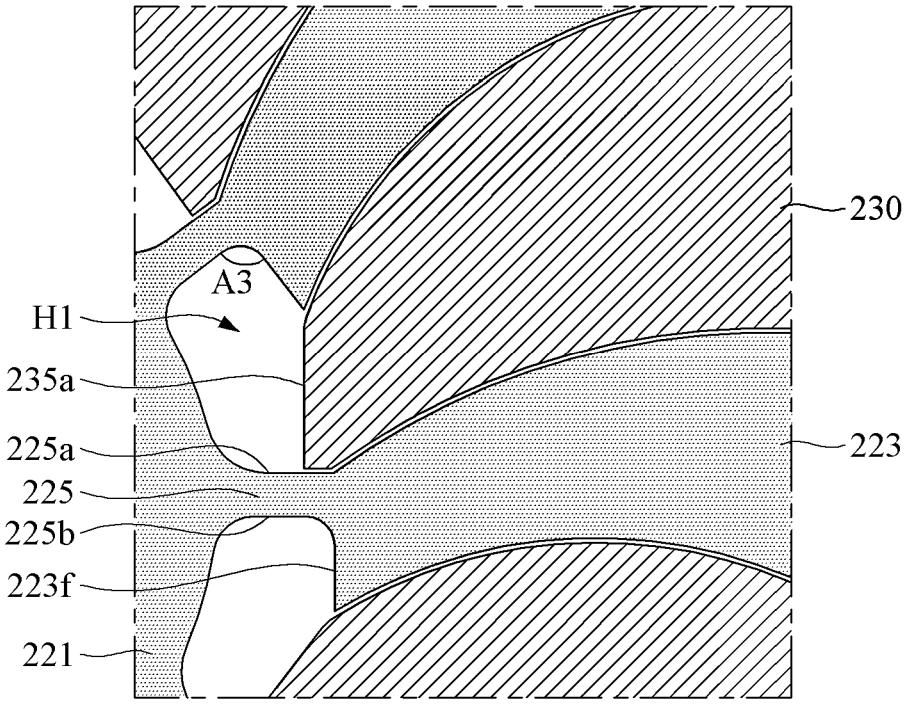
【FIG. 17】
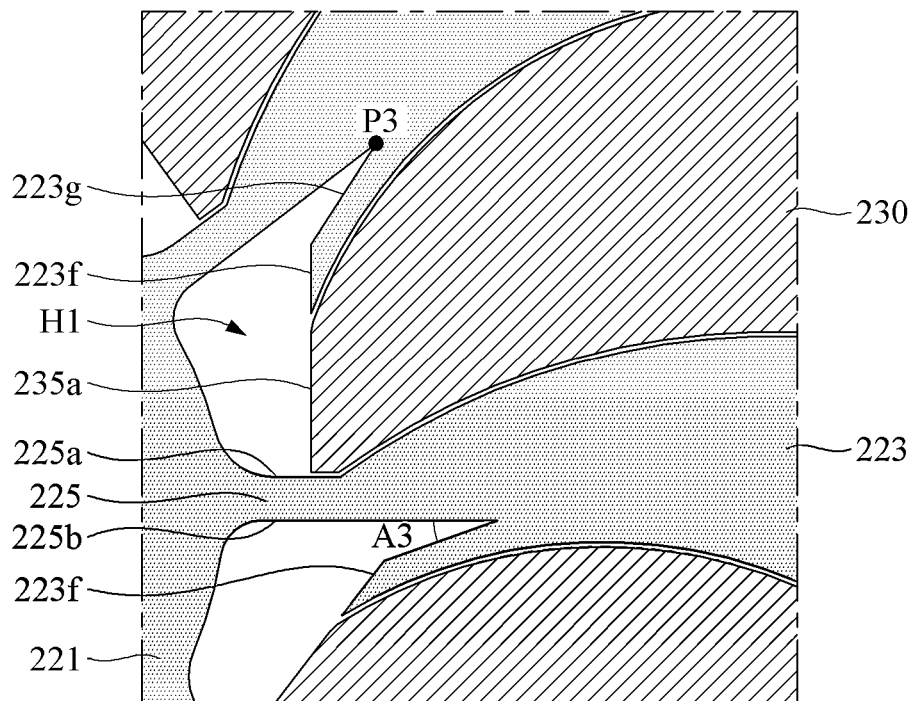

【FIG. 18】
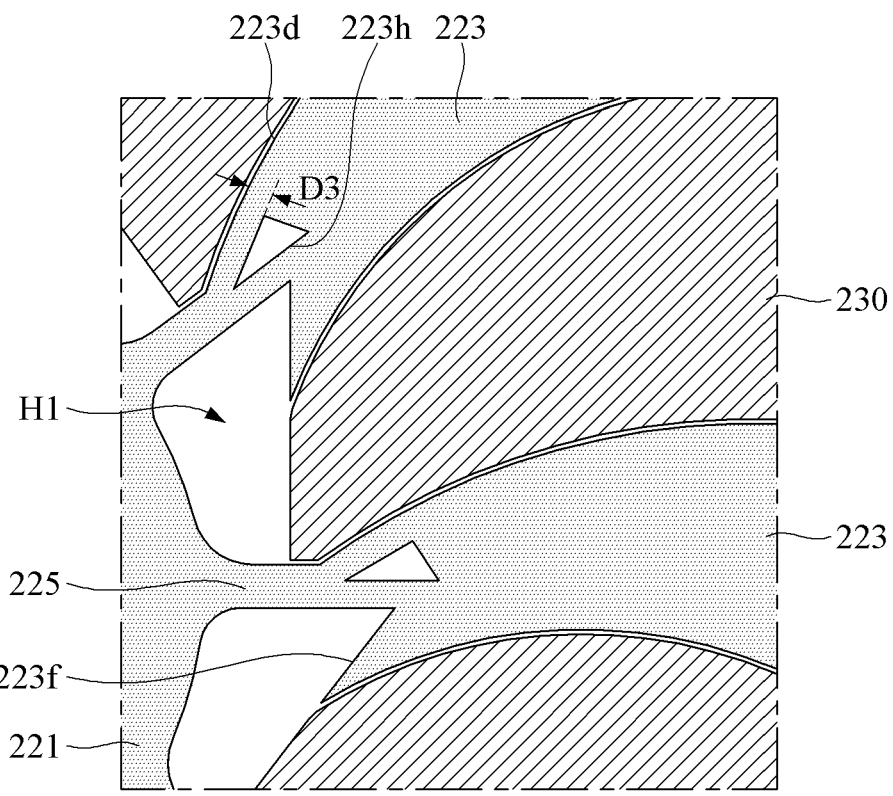
【FIG. 19】
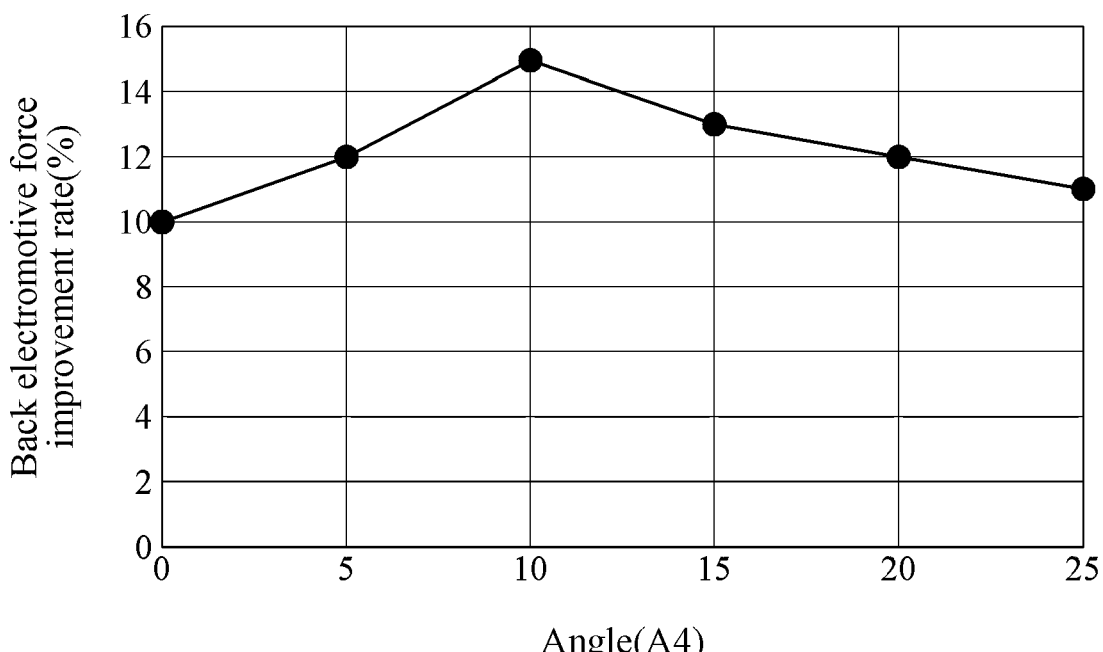

【FIG. 20】
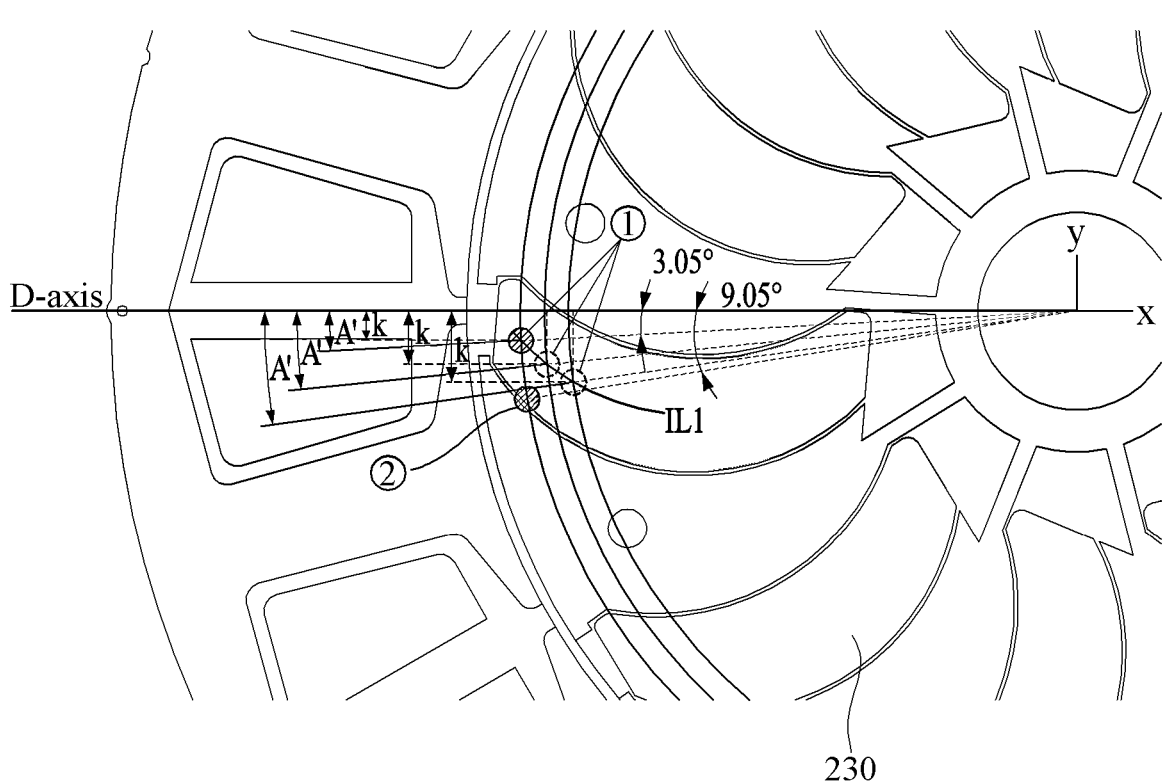

【FIG. 21】
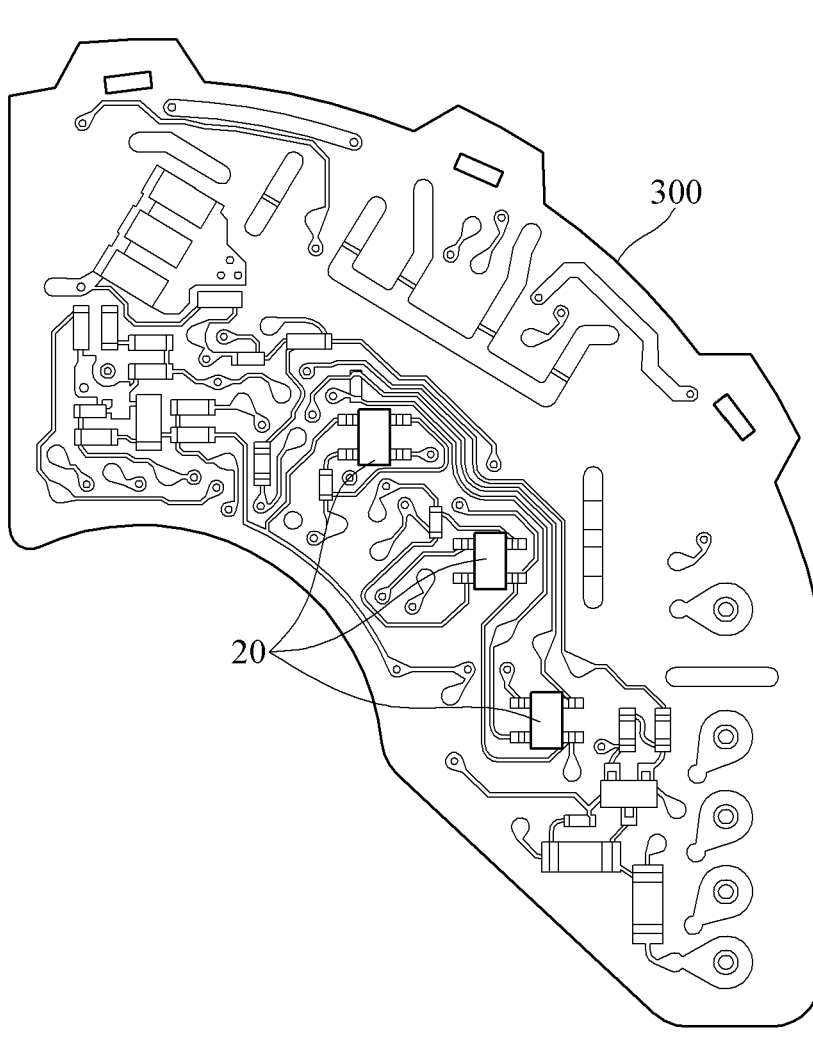

FLUX-CONCENTRATED MOTOR

CROSS-REFERENCE TO RELATED PATENT APPLICATIONS

This application is a U.S. National Stage Application under 35 U.S.C. § 371 of PCT Application No. PCT/2023/000308, filed Jan. 6, 2023, which claims priority to Korean Patent Application No. 10-2022-0109044, filed Aug. 30, 2022, whose entire disclosures are hereby incorporated by reference.

TECHNICAL FIELD

The present disclosure relates to a flux-concentrated motor, and more particularly, to a flux-concentrated motor having an arc-type permanent magnet.

BACKGROUND ART

A motor is a machine that obtains rotational force from electrical energy and is equipped with a stator and a rotor. The rotor is configured to interact electromagnetically with the stator and rotates by the force acting between a magnetic field and a current flowing in a coil.

Motors that use permanent magnets to generate magnetic fields are divided into a surface permanent magnet (SPM) motor and an interior permanent magnet (IPM) motor according to a combination structure of permanent magnets installed in a rotor core.

Here, the surface permanent magnet (SPM) motor has motor has a structure in which a permanent magnet is attached to a core surface of the rotor, and has relatively low noise and vibration and good rotational power, but has a disadvantage of come-off of the permanent magnet, and deterioration in mechanical rigidity, and not being easy to control to diversify an operating area when rotating at a high speed.

In addition, the interior permanent magnet (IPM) motor has a structure in which a permanent magnet is inserted and fixed into an embedded hole formed by penetrating upward and downward into the core of the rotor, and has a feature in which in addition to an electromagnetic torque, a reluctance torque due to a salient pole structure is added, which increases torque and output compared to the surface permanent magnet (SPM) motor.

Meanwhile, in recent years, a flux-concentrated motor has been developed which improves the efficiency of the motor by further improving the torque and output compared to the interior permanent magnet (IPM) motor. The flux-concentrated motor is also called a spoke type motor.

The flux-concentrated motor has a structurally high magnetic flux concentration, so the flux-concentrated motor can generate high torque and high output, and has an advantage of being able to miniaturize the rotor for the same output, so the flux-concentrated motor can be applied to drive motors of washing machines, or electric vehicles, and air-conditioners requiring high-torque and high-output characteristics.

In general, a flux concentrate type rotor provided in the flux-concentrated motor includes a square bar-type permanent magnet (hereinafter, referred to as "bar-type permanent") arranged radially around a shaft, and a rotor core that is provided to support the square bar-type permanent magnet and form a path for a flux.

The rotor core can be configured to include yokes disposed between respective bar-type permanent magnets, and a cylindrical base located between the shaft and the bar-type permanent magnets and connected to each of the yokes.

However, when the flux concentrate type rotor using the bar-type permanent magnet is formed in an open slot structure, there is a problem in that force of magnetic scattering is concentrated on fixed protrusions formed on both edges of an outer end of an outer diameter portion core, so mechanical rigidity is vulnerable.

In addition, the flux concentrate type rotor having the bar-type permanent magnet has a limit to increasing a pole arc of the magnet due to a permanent magnet shape.

Therefore, a flux concentrate type rotor equipped with an arc-type permanent magnet that can increase the pole arc compared to the bar-type permanent magnet at the same rotor size has been developed.

An example of the flux concentrate type rotor equipped with the arc-type permanent magnet is disclosed in US Pub. No. 2017/0187256A1 (hereinafter, referred to as "Prior Patent 1").

However, in the case of Prior Patent 1, the performance of each design parameter of the arc-type permanent magnet for maximizing the performance of the motor is not disclosed at all, and the shape design of the arc-type permanent magnet is not disclosed at all.

Meanwhile, the flux-concentrated motor is equipped with a hall sensor to determine the position of the rotor, especially the position of the permanent magnet.

In order for the hall sensor to normally operate, a reference electrical angle (Reference EAng, A) value of a phase difference between waveforms of back electromotive force of the motor and a hall sensor voltage is required. The reference electrical angle is a required reference value of an IC element for motor control, and reference electrical angles are different from each other for each company, such as 120 degrees, 150 degrees, and 180 degrees, but in general, 150 degrees is generally used as the reference electrical angle.

The hall sensor voltage is generated by recognizing an axial flux value of the bar-type permanent magnet, and the back electromotive force causes a voltage induced in a stator coil as the rotor rotates.

In the flux-concentrated motor, the hall sensor must be installed in an optimal position to check the flux of the permanent magnet.

Therefore, when a method for determining the position of the hall sensor in the flux-concentrated motor in the related art, which is equipped with the bar-type permanent magnet is described, the position of the hall sensor is selected as a point moved from a D-axis by a shift mechanical angle (C/E) in [Table 1] below.

TABLE 1

| | Parts | Case1 | Case2 | Case3 |
|---|---|---|---|---|
| A | Reference EAng.(Bemf-Vh) | 120 | 150 | 180 |
| B | Sensing EAng.(@D-Axis) | 180 | 180 | 180 |
| C | Shin EAng.(B – A) | 60 | 30 | 0 |
| D | Poles | 10 | 10 | 10 |
| E | Poles Pare | 5 | 5 | 5 |
| C/E | Shift Ang. | 12 | 6 | 0 |
| Hall Sensor position(@Final position) | | Ang.(D-Axis) + (C/E) | | |

[Table 1] above shows a case where a PCD of the hall sensor is 46 mm as an example.

In [Table 1] above, the reference electrical angle (Reference EAng, "A") is a value acquired by excluding the hall sensor voltage Vh from the back electromotive force Bemf.

In addition, a sensing electrical angle (Sensing Eang, "B") refers to a phase difference from a back electromotive force waveform when the hall sensor is on the D-axis, and is in phase (0 degree) with or is different by 180 degrees from the back electromotive waveform according to a method for recognizing "−" or "+" of the flux value.

In addition, a shift electrical angle (Shift Eang, "C") as an angle corresponding to a position to which the hall sensor should be moved in order to satisfy the reference electrical angle (Reference Eang) is a value acquired by excluding the reference electrical angle A from the sensing electrical angle B (C=B−A).

In addition, a shift mechanical angle (Shift Ang, (C/E)) is a value acquired by converting the shift electrical angle C into a mechanical angle, and is a value by dividing the shift electrical angle C by the number of pole pairs (E) of the flux-concentrated motor.

Accordingly, in the flux concentrate type equipped with the bar-type permanent magnet, the position moved by the shift mechanical angle (C/E) with the rotor aligned on the D-axis is selected as the position of the hall sensor.

That is, in the flux concentrate type equipped with the bar-type permanent magnet, a point moved from the D-axis by the shift mechanical angle (C/E) on a pitch circle diameter (PCD) is selected as the position of the hall sensor.

Here, the D-axis refers to a position where the rotor is aligned when DC current is applied to an A-phase coil, and is defined according to the number of poles/slots of the flux-concentrated motor.

In the magnetic flux-concentrated motor equipped with the bar-type permanent magnet, the D-axis and the bar-type permanent magnet are aligned.

Here, the fact that the D-axis and the bar-type permanent magnet are aligned means that a virtual line connecting a transverse center of the bar-type permanent magnet in the longitudinal direction of the bar-type permanent magnet coincides with the D-axis.

Therefore, referring to [Table 1], in Case 1 where the reference electrical angle A is 120 degrees, the hall sensor is installed at a position moved by 12 degrees while the rotor is aligned on the D-axis, in Case 2 where the reference electrical angle A is 150 degrees, the hall sensor is installed at a position moved by 6 degrees while the rotor is aligned on the D-axis, and in Case 3 where the reference electrical angle A is 180 degrees, the hall sensor is installed by 0 degree while the rotor is aligned on the D-axis.

FIG. 1 illustrates a position where a hall sensor 20 is installed in a 10-pole flux-concentrated motor equipped with a bar-type permanent magnet 10.

A technology for designing the position/angle of the Hall sensor and the relative position (electrical angle/mechanical angle) between Hall sensors in the magnetic flux-concentrated motor equipped with the bar-type permanent magnet is disclosed in CN Pub. 209283062U (hereinafter, referred to as "Prior Patent 2").

However, in the case of Prior Patent 2, the position of the Hall sensor is just designed by limiting the electrical angle of 120 degrees, which is generally used in a 3-phase flux-concentrated motor, to the number of poles of the magnetic flux-concentrated motor.

Therefore, research is being conducted to install the Hall sensor at an accurate position/angle in the flux-concentrated motor equipped with the arc-type permanent magnet rather than the bar-type permanent magnet.

PRIOR ART DOCUMENT

Patent Document

Prior Patent: US Pub. No. 2017/0187256A1
Prior Patent 2: CN Pub. No. 209283062U

DISCLOSURE

Technical Problem

A technical object to be achieved by the disclosure is to provide a flux-concentrated motor equipped with an arc-type permanent magnet, in which a hall sensor is enabled to be installed at an exact position according to variables such as a PCD of the hall sensor, a shape of the arc-type permanent magnet, and an embedding angle of the arc-type permanent magnet.

Another technical object to be achieved by the disclosure is to provide a flux-concentrated motor equipped with an arc-type permanent magnet, in which the hall sensor is installed at the exact position to maximize the performance of the flux-concentrated motor.

Yet another technical object to be achieved by the disclosure is to provide a flux-concentrated motor equipped with an arc-type permanent magnet, in which back electromotive force can be effectively increased compared to a magnetic usage in the same rotor size.

Still yet another technical object to be achieved by the disclosure is to provide a flux-concentrated motor equipped with an arc-type permanent magnet, which can maximize the back electromotive force.

Still yet another technical object to be achieved by the disclosure is to provide a flux-concentrated motor equipped with an arc-type permanent magnet, in which force of magnet scattering is effectively dispersed while adopting an open slot structure to increase mechanical rigidity.

The technical objects of the present disclosure are not limited to the aforementioned technical objects, and other technical objects, which are not mentioned above, will be apparently appreciated by a person having ordinary skill in the art from the following description.

Technical Solution

According to an aspect of the present disclosure, a flux-concentrated motor includes: a flux-concentrated rotor having multiple arc-type permanent magnets embedded therein, each arc-type permanent magnet comprising an inner diameter portion formed with a first curvature, an outer diameter portion formed with a second curvature, and a connecting portion for connecting an end of the inner diameter portion to an end of the outer diameter portion; and a printed circuit board having a hall sensor for identifying the position of the arc-type permanent magnets, and in a state in which the flux-concentrated rotor is D-axis aligned, the hall sensor is positioned on a pitch circle diameter (PCD) of the hall sensor in a position shifted from the D-axis by a first mechanical angle, and the first mechanical angle is the sum of second and third mechanical angles.

The second mechanical angle is an angle at which a hall sensor moves to satisfy a reference electric angle in a flux-concentrated motor in which multiple bar-type permanent magnets are embedded in a flux-concentrated rotor having the same number of poles and PCD as the above flux-concentrated rotor, and the third mechanical angle is an angle between the D-axis and a point of intersection between the PCD of the hall sensor and a first virtual line connecting transverse centers of the arc-type permanent magnet in the longitudinal direction of the arc-type permanent magnets.

The third mechanical angle is determined based on the PCD of the hall sensor, a shape of the arc-type permanent magnet, and an embedding angle of the arc-type permanent magnet.

According to such a configuration, since the position of the hall sensor is determined by reflecting the third mechanical angle determined based on the PCD of the hall sensor, and the shape of the arc-type permanent magnet and the embedding angle of the arc-type permanent magnet, the hall sensor may be installed at the exact position.

The third mechanical angle may be calculated based on Equation (1) below, and in Equation (1) above, A' represents the third mechanical angle, and k represents a vertical distance between the intersection points.

$$A' = \sin^{-1}\{k/(PCD/2)\} \qquad (1)$$

When the third mechanical angle is calculated based on Equation (1) above, the position of the hall sensor may be easily set in various types of flux-concentrated motors in which the number of poles, the number of pole pairs, the PCD of the hall sensor, the shape of the arc-type permanent magnet, and the embedding angle of the arc-type permanent magnet are different.

The flux-concentrated rotor may include a shaft; a rotor core; and the multiple arc-type permanent magnets.

The rotor core may include an annular ring-shaped inner diameter portion core having a shaft through-hole into which the shaft is inserted, multiple outer diameter portion cores arranged in a circumferential direction of the inner diameter portion core on an outer peripheral surface of the inner diameter portion corer, and disposed to be spaced apart from each other so that permanent magnet insertion portions for accommodating the multiple arc-type permanent magnets, and multiple bridges corresponding to the outer diameter portion cores, respectively, and arranged in the circumferential direction of the inner diameter portion core, and connecting each of the outer diameter portion cores to the inner diameter portion core.

At this time, the outer diameter portion core may include a first cutout portion positioned on a lower end.

According to such a configuration, since flux is bent and flows due to a first cutout portion, a leakage path of the flux is relatively increased, so magnetic resistance is increased, and a leakage flux amount through a bridge is reduced.

Accordingly, the back electromotive force of the flux-concentrated motor can be raised, the performance of the motor can be improved, and an output density of the motor can be increased.

Each of the plurality of arc-type permanent magnets may satisfy at least any one of five following equations.

$$A1 = k1 * C1 \ (k1 \text{ is } 0.31 \text{ to } 0.37) \qquad (2)$$

$$B1 = k2 * A1 \ (k2 \text{ is } 2.9 \text{ to } 3.75) \qquad (3)$$

$$B1 = k3 * E1 \ (k3 \text{ is } 1.8 \text{ to } 2.7) \qquad (4)$$

-continued
$$D1 = k4 * C1 \ (k4 \text{ is } 0.62 \text{ to } 0.98) \qquad (5)$$

$$M1 = (C1/D1) * A1/(C1 - D1) \ (M1 \text{ is } 2.5 \text{ or more}) \qquad (6)$$

In Equations (2) to (6), A1 represents a thickness of the arc-type permanent magnet, B1 represents a width of the arc-type permanent magnet, C1 represents a first curvature of the inner diameter portion, D1 represents a second curvature of the outer diameter portion, and E1 represents a magnetization center point gap.

According to such a configuration, the arc-type permanent magnet is designed by using five variables (a magnet thickness, a magnet width, a first curvature of an inner diameter portion, a second curvature of an outer diameter portion, and a magnetization center point gap), so an arc-type permanent magnet having high back electromotive force compared to a magnet usage can be manufactured, and an arc-type permanent magnet with maximized back electromotive force can be manufactured.

The second curvature of the arc-type permanent magnet may be larger than the first curvature.

However, the second curvature of the arc-type permanent magnet may be the same as the first curvature, or smaller than the first curvature.

The connecting portion of the arc-type permanent magnet may include a first straight portion connected to the end of the outer diameter portion and a second straight portion connecting the end of the first straight portion and the end of the inner diameter portion.

Ten arc-type permanent magnets may be embedded in the rotor core. That is, the flux-concentrated motor of the present disclosure may be a 10-pole motor.

The arc-type permanent magnet may be inserted into the permanent magnet insertion portion so as maintain an angle of 5 degrees to 20 degrees between a first connection line connecting a center of the inner diameter portion core and a center of the first straight portion formed on one end of the arc-type permanent magnet, and a second connection line connecting the center of the inner diameter portion core and a center of the first straight portion formed on the other end of the arc-type permanent magnet.

According to such a configuration, a placement angle or an embedding angle of the arc-type permanent magnet is optimized to further raise the back electromotive force.

The outer diameter portion core may include a first side surface which in contact with an inner diameter portion of a first arc-type permanent magnet among two adjacent arc-type permanent magnets, and a second side surface which is in contact with an outer diameter portion of a second arc-type permanent magnet positioned at an opposite side to the first side surface among the two arc-type permanent magnets, and the first cutout portion may be extended to the first side surface from an end of the second side surface of the outer diameter portion core.

The bridge may include a first side surface which is extended from the end of the first side surface of the outer diameter portion core, and connected to the inner diameter portion corer, and a second side surface which is positioned at an opposite side to the first side surface of the bridge, and connected to the inner diameter portion core.

The second side surface of the bridge may be positioned to be spaced from the end of the outer diameter portion of the second arc-type permanent magnet to the first side surface of the outer diameter portion core.

A part of the first side surface of the bridge may be in contact with at least a part of the connecting portion of the first arc-type permanent magnet.

The first cutout portion may be extended to the first side surface of the outer diameter portion core from a point where the first straight portion of the first arc-type permanent magnet and a lower end portion of the second side surface of the outer diameter portion core are connected.

The second side surface of the bridge may be extended from an end of the first cutout portion and connected to the inner diameter portion core.

A portion where the second side surface of the bridge and the end of the first cutout portion are connected may be positioned outside the first straight portion of the first arc-type permanent magnet in a radial direction.

The first cutout portion and the second side surface of the bridge may form an acute angle.

The first cutout portion may be parallel to at least a part of the connecting portion of the second arc-type permanent magnet contacting the second side surface of the outer diameter portion core.

The outer diameter portion core may further include a second cutout portion extended outside the end of the first cutout portion in the radial direction.

According to such a configuration, compared to the case where the outer diameter portion includes only the first cutout portion, since flux is further bent and flows due to a second cutout portion, a leakage path of the flux is relatively increased, so magnetic resistance may be further increased, and a leakage flux amount through a bridge may be further reduced.

The second side surface of the bridge may be extended from an end of the second cutout portion and connected to the inner diameter portion core.

A portion where the second side surface of the bridge and the end of the second cutout portion are connected may be positioned outside the first straight portion of the first arc-type permanent magnet in a radial direction.

The second cutout portion and the second side surface of the bridge may form the acute angle.

The first cutout portion may be parallel to at least a part of the connecting portion of the second arc-type permanent magnet contacting the second side surface of the outer diameter portion core.

Advantageous Effects

According to the present disclosure, in the flux-concentrated motor equipped with the arc-type permanent magnet, since the hall sensor is enabled to be installed at the exact position, it is possible to maximize the performance the flux-concentrated motor equipped with the arc-type permanent magnet.

The arc-type permanent magnet is designed by using five variables (a magnet thickness, a magnet width, a first curvature of an inner diameter portion, a second curvature of an outer diameter portion, and a magnetization center point gap), so an arc-type permanent magnet having high back electromotive force compared to a magnet usage can be manufactured, and an arc-type permanent magnet with maximized back electromotive force can be manufactured.

In addition, since flux is bent and flows due to a first cutout portion, a leakage path of the flux is relatively increased, so magnetic resistance is increased, and a leakage flux amount through a bridge is reduced.

Accordingly, the back electromotive force of the flux-concentrated motor can be raised, the performance of the flux-concentrated motor can be improved, and an output density of the flux-concentrated motor can be increased.

In addition, a placement angle of the arc-type permanent magnet is optimized to further raise the back electromotive force of the flux-concentrated motor.

In addition, since the arc-type permanent magnet is used, even if the open slot structure is adopted, force of magnet scattering is effectively dispersed compared to the bar-type permanent magnets, increasing the mechanical rigidity of the rotor core.

An effect which can be obtained in the present disclosure are not limited to the aforementioned effect and other unmentioned advantages will be clearly understood by those skilled in the art from the following description.

DESCRIPTION OF DRAWINGS

The accompanying drawings, which are included as part of the detailed description in order to provide a thorough understanding of the present disclosure, provide embodiments of the present disclosure and together with the description, describe the technical features of the present disclosure.

FIG. 1 is a diagram illustrating a state in which a position where a hall sensor is installed in a 10-pole flux-concentrated motor equipped with a bar-type permanent magnet.

FIG. 2 is a cross-sectional view illustrating an arc-type permanent magnet that maximizes a magnet usage based on an optimized size of an arc-type permanent magnet used in a 10-pole motor.

FIG. 3 is a diagram illustrating an arc-type permanent magnet in which the thickness and magnetization center point gap of the arc-type permanent magnet illustrated in FIG. 2 are changed.

FIG. 4 is a diagram illustrating an arc-type permanent magnet in which a second curvature of an outer diameter portion and the magnetization center point gap of the arc-type permanent magnet illustrated in FIG. 2 are changed.

FIG. 5 is a diagram illustrating an arc-type permanent magnet in which a first curvature of an inner diameter portion and the magnetization center point gap of the arc-type permanent magnet illustrated in FIG. 2 are changed.

FIG. 6 is a diagram illustrating an arc-type permanent magnet in which the second curvature of the outer diameter portion and the magnetization center point gap of the arc-type permanent magnet illustrated in FIG. 2 are changed.

FIG. 7 is a diagram illustrating an arc-type permanent magnet in which the thickness and the first curvature of the inner diameter portion of the arc-type permanent magnet illustrated in FIG. 2 are changed.

FIG. 8 is a graph showing a magnitude of back electromotive force compared to a magnet usage according to a ratio of the first curvature of the inner diameter portion and the second curvature of the outer diameter portion of the arc-type permanent magnet.

FIG. 9 is a graph showing the magnitude of the back electromotive force compared to the magnet usage according to a ratio of the thickness and the width of the arc-type permanent magnet.

FIG. 10 is a graph showing the magnitude of the back electromotive force compared to the magnet usage according to a ratio of the thickness and the width of the arc-type permanent magnet.

FIG. 11 is a graph showing the magnitude of the back electromotive force compared to the magnet usage according to a ratio of the first curvature of the inner diameter portion and the thickness of the arc-type permanent magnet.

FIG. 12 is a graph showing the magnitude of the back electromotive force according to the first curvature of the inner diameter portion, the second curvature of the outer diameter portion, and the thickness of the arc-type permanent magnet.

FIG. 13 is a diagram illustrating a schematic configuration of a flux concentrate type rotor with an arc-type permanent magnet, and a flux-concentrated motor equipped with the rotor according to an embodiment of the present disclosure.

FIG. 14 is a diagram illustrating a specific configuration of a rotor core illustrated in FIG. 13.

FIG. 15 is a diagram for describing a leakage flux generated in the flux concentrate type rotor illustrated in FIG. 13.

FIG. 16 is a diagram illustrating a schematic configuration of a rotor core provided in a flux concentrate type rotor according to a second embodiment of the present disclosure.

FIG. 17 is a diagram illustrating a schematic configuration of a rotor core provided in a flux concentrate type rotor according to a third embodiment of the present disclosure.

FIG. 18 is a diagram illustrating a schematic configuration of a rotor core provided in a flux concentrate type rotor according to a fourth embodiment of the present disclosure.

FIG. 19 is a graph showing an improvement rate of back electromotive force according to an arrangement angle of the arc-type permanent magnet.

FIG. 20 is a diagram illustrating a position where a hall sensor is installed in a 10-pole flux-concentrated motor equipped with an arc-type permanent magnet.

FIG. 21 is a bottom view of a printed circuit board provided in the 10-pole magnetic flux-concentrated motor equipped with the arc-type permanent magnet.

MODE FOR DISCLOSURE

Hereinafter, embodiments disclosed in the present disclosure will be described in detail with reference to the accompanying drawings and the same or similar components are denoted by the same reference numerals regardless of a sign of the drawing, and duplicated description thereof will be omitted.

Suffixes "assembly" and "unit" for components used in the following description are given or mixed in consideration of easy preparation of the present disclosure only and do not have their own distinguished meanings or roles.

Further, in describing the embodiment of the present disclosure, a detailed description of related known technologies will be omitted if it is determined that the detailed description makes the gist of the embodiment disclosed in the present disclosure unclear.

Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Terms including an ordinary number, such as first and second, are used for describing various constituent elements, but the constituent elements are not limited by the terms. The terms are used only to discriminate one component from another component.

It should be understood that, when it is described that a component is "coupled to" or "contacts" another component, the component may be directly coupled to or directly contact the other component or a third component may be present therebetween.

In contrast, when it is described that a component is "directly coupled to" or "directly contacts" another component, it is understood that no component is present between the component and another component.

A singular form includes a plural form if there is no clearly opposite meaning in the context.

In the present disclosure, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Hereinafter, preferred embodiments according to the present disclosure will be described in detail with reference to the accompanying drawings, and like or similar components are denoted by the same reference numerals regardless of a sign of the drawing, and duplicated description thereof will be omitted.

FIG. 2 is a cross-sectional view illustrating an arc-type permanent magnet that maximizes a magnet usage based on an optimized size of an arc-type permanent magnet used in a 10-pole motor.

In addition, FIGS. 3 to 7 are diagrams illustrating an arc-type permanent magnet according to embodiments when at least two elements among five design elements are changed.

First, referring to FIG. 2, the arc-type permanent magnet 230 is an arc-type permanent magnet that includes an inner diameter portion 231 formed with a first curvature C1 and an outer diameter portion 233 formed with a second curvature D1.

In the present disclosure, the second curvature D1 of the outer diameter portion 233 and the first curvature C1 of the inner diameter portion 231 are different from each other.

That is, the second curvature D1 of the outer diameter portion 233 may be larger than the first curvature C1 of the inner diameter portion 231, and the first curvature C1 of the inner diameter portion 231 may be larger than the first curvature D1 of the outer diameter portion 233.

The arc-type permanent magnet 230 further includes a connecting portion 235 connecting the end of the inner diameter portion 231 and the end of the outer diameter portion 233, and the connecting portion 235 includes a first straight portion 235*a* connected to the end of the outer diameter portion 233, and a second straight portion 235*b* connecting the end of the first straight portion 235*a* and the end of the inner diameter portion 231.

In addition, the first straight portion 235*a* and the second straight portion 235*b* may be formed to have an interior angle A2 of 90 degrees.

FIG. 2 illustrates an arc-type permanent magnet 230 in which the first curvature C1 of the inner diameter portion 231 is R12.5, the second curvature D1 of the outer diameter portion 233 is R8.0, and a magnetization center point gap E1 is 10.0.

Here, the magnetization center point gap E1 refers to a distance between a center point of the first curvature C1 and a center point of the second curvature D1.

In addition, the arc-type permanent magnet 230 illustrated in FIG. 2 has a thickness A1 of 5.5 and a width B1 of 15.1.

FIG. 3 is a diagram illustrating an arc-type permanent magnet in which the thickness and magnetization center point gap of the arc-type permanent magnet illustrated in FIG. 2 are changed.

In the arc-type permanent magnet of the embodiment, the remaining design factor other than the thickness A1 and the magnetization center point gap E1, that is, the width B1, and the first curvature C1 of the inner diameter portion and the second curvature D1 of the outer diameter portion have the same values as the arc-type permanent magnet in FIG. 2.

The thickness A1 of the arc-type permanent magnet illustrated in FIG. 3 is 4.5, and the magnetization center point gap E1 is 9.

FIG. 4 is a diagram illustrating an arc-type permanent magnet in which a second curvature of an outer diameter portion and the magnetization center point gap of the arc-type permanent magnet illustrated in FIG. 2 are changed.

In the arc-type permanent magnet of the embodiment, the remaining design factor other than the second curvature D1 of the outer diameter portion and the magnetization center point gap E1, that is, the width B1, and the first curvature C1 of the inner diameter portion and the thickness A1 have the same values as the arc-type permanent magnet in FIG. 2.

The second curvature D1 of the outer diameter portion of the arc-type permanent magnet illustrated in FIG. 4 is R10.0, and the magnetization center point gap E1 is 7.

FIG. 5 is a diagram illustrating an arc-type permanent magnet in which a first curvature of an inner diameter portion and the magnetization center point gap of the arc-type permanent magnet illustrated in FIG. 2 are changed.

In the arc-type permanent magnet of the embodiment, the remaining design factor other than the first curvature C1 of the inner diameter portion and the magnetization center point gap E1, that is, the width A1, and the width B1 and the second curvature D1 of the outer diameter portion have the same values as the arc-type permanent magnet in FIG. 2.

The first curvature C1 of the inner diameter portion of the arc-type permanent magnet illustrated in FIG. 5 is R10.5, and the magnetization center point gap E1 is 5.

FIG. 6 is a diagram illustrating an arc-type permanent magnet in which the second curvature of the outer diameter portion and the magnetization center point gap of the arc-type permanent magnet illustrated in FIG. 2 are changed.

In the arc-type permanent magnet of the embodiment, the remaining design factor other than the width B1, and the second curvature D1 of the outer diameter portion and the magnetization center point gap E1, that is, the thickness A1, and the first curvature C1 of the inner diameter portion have the same values as the arc-type permanent magnet in FIG. 2.

The width B1 of the arc-type permanent magnet illustrated in FIG. 6 is 13, the second curvature D1 of the outer diameter portion is R14.0, and the magnetization center point gap E1 is 3.

FIG. 7 is a diagram illustrating an arc-type permanent magnet in which the thickness and the first curvature of the inner diameter portion of the arc-type permanent magnet illustrated in FIG. 2 are changed.

In the arc-type permanent magnet of the embodiment, the remaining design factor other than the thickness A1, and the first curvature C1 of the inner diameter portion, that is, the width B1, and the second curvature D1 of the outer diameter portion and the magnetization center point gap E1 have the same values as the arc-type permanent magnet in FIG. 2.

The thickness A1 of the arc-type permanent magnet illustrated in FIG. 7 is 4, the first curvature C1 of the inner diameter portion is R13, and the magnetization center point gap E1 is 7.

[Table 2] below discloses a magnet usage, back electromotive force Bemf, and back electromotive force compared to the magnet usage of the arc-type permanent magnet illustrated in each of FIGS. 2 to 7.

TABLE 2

| | FIG. 2 | FIG. 3 | FIG. 4 | FIG. 5 | FIG. 6 | FIG. 7 |
|---|---|---|---|---|---|---|
| Magnet usage | 128% | 100% | 109% | 114% | 102% | 96% |
| Back electromotive force | 55.8 | 50.9 | 56.1 | 57.1 | 51.7 | 52.8 |
| Back electromotive force/magnet usage | 0.436 | 0.502 | 0.503 | 0.494 | 0.500 | 0.543 |

Referring to [Table 2] above, it is possible optimize a performance required for the corresponding motor while approximately changing five design factors, that is, the thickness A1, the width B1, the first curvature C1 of the inner diameter portion, the second curvature D1 of the outer diameter portion, and the magnetization center point gap E1.

As an example, in the case of an air conditioner motor that requires magnetic overhang to maintain a spacing of sensors, it is desirable to use the arc-type permanent magnet illustrated in FIG. 5.

In addition, it is preferable to use the arc-type permanent magnet illustrated in FIG. 7 as an arc-type permanent magnet that has a large effect of increasing the back electromotive force compared to the magnet usage.

For the bar-type permanent magnet, the width and thickness of the permanent magnet are used as design factors.

However, it is difficult to diversify the shape design of the permanent magnet with the above two design factors, and when an outer diameter of a shaft is determined according to an applied product group, a range thereof is further limited.

In addition, in the case of the bar-type permanent magnet, the thickness of the permanent magnet is highly correlated with the demagnetization resistance of the motor, and the length of the permanent magnet contributes more to improving the back electromotive force of the motor.

However, in the flux concentrate type rotor, the longer the length of the bar-type permanent magnet, the deeper a lower end portion of the bar-type permanent magnet is located toward an inner diameter portion core, which also causes a problem of lower magnetization of the bar-type permanent magnet.

However, in the case of the arc-type permanent magnet of the present disclosure, when the arc-type permanent magnet has the same magnet volume as the bar-type, it is possible to design the length of the arc-type permanent magnet (width of the arc-type permanent magnet) short, and it is also possible to design the thickness of both ends to be thin, so the arc-type permanent magnet is also advantageous compared to the bar-type permanent magnet in terms of magnetization.

In addition, according to the present disclosure, it is possible to analyze the effect of increasing the back electromotive force of the motor according to five design factors (thickness, width, first curvature of the inner diameter portion, second curvature of the outer diameter portion, and magnetization center point gap) defined in the present disclosure, and it is possible to maximize the effect of the motor by specifying a ratio of each factor.

Hereinafter, the effect of increasing the back electromotive force compared to the magnet usage according to the ratio of each factor will be described with reference to FIGS. 8 to 11.

FIG. 8 is a graph showing a magnitude of back electromotive force compared to a magnet usage according to a ratio of the first curvature of the inner diameter portion and the second curvature of the outer diameter portion of the arc-type permanent magnet, and FIG. 9 is a graph showing the magnitude of the back electromotive force compared to the magnet usage according to a ratio of the thickness and the width of the arc-type permanent magnet.

In addition, FIG. 10 is a graph showing the magnitude of the back electromotive force compared to the magnet usage according to a ratio of the thickness and the width of the arc-type permanent magnet, and FIG. 11 is a graph showing the magnitude of the back electromotive force compared to the magnet usage according to a ratio of the first curvature of the inner diameter portion and the thickness of the arc-type permanent magnet.

Referring to FIGS. 8 to 11, the arc-type permanent magnet may be designed to satisfy at least one of Equations (2) to (5) below.

$$A1 = k1 * C1 \ (k1 \ \text{is} \ 0.31 \ \text{to} \ 0.37) \tag{2}$$

$$B1 = k2 * A1 \ (k2 \ 2.9 \ \text{to} \ 3.75) \tag{3}$$

$$B1 = k3 * E1 \ (k3 \ 1.8 \ \text{to} \ 2.7) \tag{4}$$

$$D1 = k4 * C1 \ (k4 \ 0.62 \ \text{to} \ 0.98) \tag{5}$$

In Equations (2) to (5), units of the thickness A1, the width B1, and the magnetization center point gap E1 of the arc-type permanent magnet may be the same as each other.

As an example, the units of the thickness A1, the width B1, and the magnetization center point gap E1 of the arc-type permanent magnet may be mm or cm.

In Equations (2) to (5) above, when k1 to k4 satisfy the values, respectively, the back electromotive force (back electromotive force/magnet usage) compared to the magnet usage of the arc-type permanent magnet is approximately 0.5 or more.

On the other hand, a motor with excellent back electromotive force is intended to be designed rather than excellent back electromotive force performance compared to the magnet usage, Equation (6) below may be referenced.

$$M1 = (C1/D1) * A1/(C1 - D1) \ (M1 \ \text{is} \ 2.5 \ \text{or more}) \tag{6}$$

Referring to FIG. 12, it can be seen that the back electromotive force rises rapidly as a design variable "M1" exceeds 2, and then a slope becomes gentle.

Therefore, when designing an arc-type permanent magnet that maximizes the back electromotive force, it is desirable to set the design variable "M1" to 2.5 or more.

According to the above description, it is possible to design an arc-type permanent magnet to satisfy at least one of Equations (2) to (6), depending on the required performance or condition of the motor.

Hereinafter, a flux-concentrate type rotor equipped with the arc-type permanent magnet and a 10-pole flux-concentrated motor equipped with the rotor according to the present disclosure will be described.

FIG. 13 is a diagram illustrating a schematic configuration of a flux concentrate type rotor with an arc-type permanent magnet, and a flux-concentrated motor equipped with the rotor according to an embodiment of the present disclosure, FIG. 14 is a diagram illustrating a specific configuration of a rotor core illustrated in FIG. 13, and FIG. 15 is a diagram for describing a leakage flux generated in the flux concentrate type rotor illustrated in FIG. 13.

A motor equipped with a flux concentrate type rotor according to a first embodiment of the present disclosure includes a stator 100 and a flux concentrate type rotor 200.

The stator 100 may include a stator core 110, and a plurality of teeth 120 protruding from the stator core 110 in a radial direction. The stator core 110 may be formed in an annular shape.

A radial inner end of the tooth 120 may be provided with a pole shoe 130 extending on both sides in a circumferential direction. A slot 140 is formed between the teeth. Accordingly, a coil 150 is wound through the teeth 120 and the slot 140.

The flux concentrate type rotor 200 includes a shaft 210, a rotor core 220, and an arc-type permanent magnet 230.

As illustrated in FIG. 2, the arc-type permanent magnet 230 includes an inner diameter portion 231 formed with a first curvature C1 and an outer diameter portion 233 formed with a second curvature D1.

The second curvature D1 of the outer diameter portion 233 may be formed to have a different size from the first curvature D1 of the inner diameter portion 231, and the second curvature D1 of the outer diameter portion 233 may also be formed to be larger than the first curvature C1 of the inner diameter portion 231, or conversely, may be formed to be smaller than the first curvature C1 of the inner diameter portion 231.

The magnetization direction of each arc-type permanent magnet 230 proceeds in a tangential direction T, and the outer diameter portion 233 is formed as a strong flux surface, and the inner diameter portion 231 is formed as a weak flux surface.

The arc-type permanent magnet 230 may further include a connecting portion 235 connecting the end of the inner diameter portion 231 and the end of the outer diameter portion 233, and the connecting portion 235 may include a first straight portion 235a connected to the end of the outer diameter portion 233, and a second straight portion 235b connecting the end of the first straight portion 235a and the end of the inner diameter portion 231.

In addition, the first straight portion 235a and the second straight portion 235b may be formed to have an interior angle A2 of 90 degrees.

The rotor core 220 includes an inner diameter portion core 221, an outer diameter portion core 223, and a bridge 225.

The inner diameter portion core 221 is formed in an annular ring shape with a shaft through hole 221a into which the shaft 210 is inserted.

Multiple outer diameter cores 223 are arranged in a circumferential direction (or tangential direction) of the inner diameter portion core 221 on the outer peripheral surface of the inner diameter portion core 221, and placed to be spaced apart from each other to form a permanent magnet insertion portion 223a for accommodating the arc-type permanent magnet 230.

A first fixing protrusion 223b and a second fixing protrusion 223c protruding in an arc direction may be formed on both edges of the outer end of the outer diameter portion core 223. The first and second fixing protrusions 223b and 223c fix the position of the arc-type permanent magnet 230 when the arc-type permanent magnet 230 is inserted into the permanent magnet insertion portion 223a, and serves to prevent the arc-type permanent magnet 230 from scattering when the rotor 200 rotates.

That is, the outer diameter portion core 223 has an open slot structure.

Multiple bridges 225 are arranged in the circumferential direction of the inner diameter portion core 221 to correspond to the outer diameter portion cores 223, respectively, and connect the outer diameter portion cores 223 to the inner diameter portion cores 221, respectively.

The outer diameter portion core 223 may be referred to as an outer core, and the inner diameter portion core 221 may be referred to as an inner core. This is because the inner diameter portion core 221 is located radially inside the outer diameter core 223. In addition, the outer diameter portion core 223 may also be referred to as a yoke.

In the permanent magnet insertion portion 223a, arc-type permanent magnets 230 having an inner diameter portion 231 with a weak flux surface and an outer diameter portion 233 with a strong flux surface are oriented with different sides from those adjacent to each other. Therefore, flux may be compensated and torque ripple may be reduced.

A gap H1 partitioned by two adjacent bridges 225 is formed on the lower end of the arc-type permanent magnet 230, that is, between the first straight portion 235a of the arc-type permanent magnet 230 and the inner diameter portion core 221.

The outer diameter portion core 223 includes a first side 223d in contact with the inner diameter portion 231 of a first arc-type permanent magnet 230A among two adjacent arc-type permanent magnets, and a second side 223e in contact with the outer diameter portion 233 of a second arc-type permanent magnet 230B among two arc-type permanent magnets, and further includes a first cutout portion 223f located at the lower end thereof.

The first cut portion 223f is extended from the end of the second side 223e of the outer diameter portion core 223 toward the first side 223d.

In addition, the bridge 225 includes a first side 225a extended from the end of the first side 223d of the outer diameter portion core 223 and connected to the inner diameter portion core 221, and a second side 225b located at an opposite side to the first side 225a and connected to the inner diameter portion core 221.

The second side 225b of the bridge 225 is located away from the end of the outer diameter portion 233 of the second arc-type permanent magnet 230B toward the first side 223d of the outer diameter portion core 223.

Here, the lower end of the second arc-type permanent magnet 230B may be the first straight portion 235a.

A spacing distance D2 of the second side 225b of the bridge 225 may be set to various values.

According to such a configuration, a portion of the first side 225a of the bridge 225 may be in contact with at least a portion of the connecting portion 235 of the first arc-type permanent magnet 230A, for example, the second straight portion 235b.

The first cutout portion 223f may be extended from a point P1 where the first straight portion 235a of the arc-type permanent magnet 230 and the lower end of the second side 223e of the outer diameter portion core 223 are connected toward the first side 223d of the outer diameter portion core 223.

As illustrated in the embodiment of FIGS. 13 to 15, the first cutout portion 223f may be extended from the point P1 where the first straight portion 235a of the second arc-type permanent magnet 230B contacting the second side surface 223e of the outer diameter portion core 223 and the lower end of the second side 223e of the outer diameter portion core 223 are connected toward the first side 223d of the outer diameter portion core 223, and extended in parallel to at least a portion of the connecting portion 235 of the second arc-type permanent magnet 230B, for example, the first straight portion 235a.

In addition, the second side 225b of the bridge 225 is extended from the end of the first cutout portion 223f and connected to the inner diameter portion core 221.

A spacing distance D2 of the second side 225b of the bridge 225 may be shorter than a length L3 of the first cutout portion 223f.

In addition, a portion P2 where the second side 225b of the bridge 225 and the end of the first cutout portion 223f are connected may be located radially outside the first straight portion 235a of the arc-type permanent magnet 230.

In addition, a maximum width W1 of the bridge 225 is smaller than a width W2 of the lower end of the outer diameter portion core 223.

In order to effectively reduce a leakage flux amount, it is preferable that the first cutout portion 223f and the second side 225b of the bridge 225 form a right angle or an acute angle A3.

In the embodiment illustrated in FIGS. 13 to 15, the first cut portion 223f and the second side 225b of the bridge 225 form the acute angle.

According to such a configuration, as illustrated in FIG. 15, the second side 225b of the bridge 225 is located away from the outer diameter portion 233 of the second permanent magnet 230B toward the first side 223d of the outer diameter portion core 223 due to the first cutout portion 223f provided on the lower end of the outer diameter portion core 223.

Therefore, compared to the flux concentrate type rotor which does not include the first cutout portion 223f, a leakage path is relatively increased, so magnetic resistance increases, and the flux is bent and flows due to the first cutout portion 223f, so the leakage flux amount decreases through the bridge 225.

In addition, since the arc-type permanent magnet is used, flux and efficiency increase compared to the bar-type permanent magnet, and even if the open slot structure is adopted, the force of magnet scattering is effectively dispersed compared to the bar-type permanent magnets, increasing the mechanical rigidity of the rotor core.

Hereinafter, the rotor core provided in the flux concentrate type rotor according to another embodiment of the present disclosure will be described.

In describing the following embodiment, the same components are denoted by the same reference numerals as the first embodiment, and a detailed description thereof is omitted.

FIG. 16 is a diagram illustrating a schematic configuration of a rotor core provided in a flux concentrate type rotor according to a second embodiment of the present disclosure.

In the embodiment illustrated in FIG. 16, the first cut portion 223f is bent toward the inner diameter portion core 221 compared to the first embodiment described above.

That is, in the first embodiment described above, the first cutout portion 223f is extended from the first straight portion 235a of the second arc-type permanent magnet 230B, and adopts a configuration extended in parallel to at least a portion of the connecting portion 235 of the second arc-type permanent magnet 230B, for example, the first straight portion 235a.

However, as in the embodiment, the first cutout portion 223f may be formed to be bent toward the inner diameter portion core 221 compared to the first embodiment described above.

In addition, in the case of the embodiment, the angle A3 between the first cutout portion 223*f* and the second side 225*b* of the bridge 225 forms approximately the right angle.

According to the present inventor's experiments, it can be seen that in order to effectively improve the back electromotive force, it is desirable to increase the leakage path, so it is desirable to form the angle A3 formed by the first cutout portion 223*f* and the second side 225*d* of the bridge 225 small.

FIG. 17 is a diagram illustrating a schematic configuration of a rotor core provided in a flux concentrate type rotor according to a third embodiment of the present disclosure.

The outer diameter portion core provided in the flux concentrate type rotor of the embodiment further includes a second cutout portion 223*g* extended outwards in the radial direction from the end of the first cutout portion 223*f* extended in parallel to at least a portion of the connecting portion 235 of the arc-type permanent magnet 230, for example, the first straight portion 235*a*, and the second side 225*b* of the bridge 225 is extended from the end of the second cutout portion 223*g* and connected to the inner diameter portion core 221.

In addition, the angle A3 between the second cutout 223*g* and the second side 225*b* of the bridge 225 forms the acute angle, and a portion P3 where the second side 225*b* of the bridge 225 and the end of the second cutout portion 223*g* are connected is located radially outside the first straight portion 235*a* of the arc-type permanent magnet 230.

Therefore, the flux concentration type rotor of the embodiment has a relatively increased leakage path compared to the first and second embodiments of the present disclosure, and thus the back electromotive force may be more greatly improved.

FIG. 18 is a diagram illustrating a schematic configuration of a rotor core provided in a flux concentrate type rotor according to a fourth embodiment of the present disclosure.

As the rotor core provided in the flux concentrate type rotor of the embodiment, a configuration is disclosed in which a hole 223*h* is formed in the outer diameter portion core 223 of the rotor core of the first embodiment described above and local saturation is generated on the lower end of the outer diameter portion core 223.

In order to effectively generate the local saturation on the leakage path of the outer diameter portion core 223, it is desirable that a gap D3 between the first side 223*d* of the outer diameter portion core 223 and the hole 223*h* is maintained at about 0.5 mm.

Meanwhile, the hole 223*h* is also applicable to the outer diameter portion core provided in other embodiments described above.

And in the case of the magnetic flux concentrate type rotor equipped with the arc-type permanent magnet, the shape design of the arc-type permanent magnet is important, but how the arc-type permanent magnet is placed in the rotor core is also an important design factor.

FIG. 19 is a graph showing an improvement rate of back electromotive force according to an arrangement angle or an embedding angle of the arc-type permanent magnet.

Referring to FIGS. 13 and 19, it can be seen that in the case of a 10-pole motor, when the arc-type permanent magnet 230 is inserted into the permanent magnet insertion portion so that an angle A4 of 5 to 20 degrees is maintained between a first connection line L4 and a second connection line L5, the back electromotive force is excellent.

Here, the first connection line L4 refers to a line connecting the center of the inner diameter portion core 221 to the center of the first straight portion 235*a* formed on one end of the arc-type permanent magnet 230, and the second connection line L5 refers to a line connecting the center of the inner diameter portion core 221 to the center of the first straight portion 235*a* formed on the other end of the arc-type permanent magnet 230.

Hereinafter, a method for selecting an exact position of the hall sensor provided in the flux-concentrated motor of the present disclosure described above will be described.

FIG. 20 is a diagram illustrating a position where a hall sensor is installed in a 10-pole flux-concentrated motor equipped with an arc-type permanent magnet, and FIG. 21 is a bottom view of a printed circuit board provided in the 10-pole magnetic flux-concentrated motor equipped with the arc-type permanent magnet.

In the flux-concentrated motor equipped with the arc-type permanent magnet, a point moved from the D-axis by a shift mechanical angle C'/E, that is, a first mechanical angle C'/E, in [Table 3] below is selected as the position of the hall sensor.

TABLE 3

| Parts | | Case1 | Case2 | Case3 |
|---|---|---|---|---|
| A | Reference EAng.(Bemf-Vh) | 120 | 150 | 180 |
| A' | Ang. | 3.05 | 3.05 | 3.05 |
| B' | Sensing EAng (@D-Axis) (B' = B + A'E) | 195.3 | 195.3 | 195.3 |
| C' | Shift EAng.(B' − A) | 75.3 | 45.3 | 15.3 |
| D | Poles | 10 | 10 | 10 |
| E | Poles Pare | 5 | 5 | 5 |
| C'/E | Shift Ang. | 15.05 | 9.05 | 3.05 |
| Hall Sensor position(@Final position) | | Ang.(D-Axis) + (C/E) | | |

[Table 3] above shows a case where a PCD of the hall sensor is 46 mm as an example.

In [Table 3] above, the reference electric angle (Reference EAng, "A") is a value acquired by excluding the hall sensor voltage Vh from the back electromotive force Bemf.

In addition, a third mechanical angle A' is a value determined based on the PCD of the Hall sensor, the shape of the arc-type permanent magnet, and the embedding angle of the arc-type permanent magnet, and refers to an angle A' formed by an intersection point ① where a first virtual line IL1 connecting the transverse center of the arc-type permanent magnet in the longitudinal direction and the PCD of the hall sensor intersect with each other, and the D-axis.

Here, the first virtual line IL1 may also be referred to as a magnetic center line.

The third mechanical angle A' may be calculated by using Equation (1) below.

$$A' = \sin^{-1}\{k/(PCD/2)\} \tag{1}$$

in Equation (1) above, A' represents the third mechanical angle, and k represents a vertical distance between the intersection points.

FIG. 20 illustrates positions ① of the hall sensor on the magnetic center line IL1 when the PCDs of the hall sensor are 42 mm, 44 mm, and 46 mm, respectively, and a final position ② of the hall sensor when the PCD of the hall sensor is 46 mm.

And the sensing electrical angle (Sensing Eang, "B'") is a value acquired by adding the sensing electrical angle B in the flux-concentrated motor equipped with the bar-type permanent magnet, that is, the second electrical angle B to a value (A'×E) acquired by multiplying the third mechanical angle A' and a pole pair E. {B'=B+(A'×E)}.

In addition, a shift electrical angle (Shift Eang, "C'") as an angle corresponding to a position to which the hall sensor should be moved in order to satisfy a reference electrical angle (Reference Eang) is a value acquired by excluding the reference electrical angle A from a sensing electrical angle B' (C'=B'−A).

In addition, a shift mechanical angle (Shift Ang, (C'/E)) is a value acquired by converting the shift electrical angle C' into a mechanical angle, and is a value by dividing the shift electrical angle C' by the number of pole pairs (E) of the flux-concentrated motor.

Accordingly, in the flux concentrate type equipped with the arc-type permanent magnet, the position ② moved by the shift mechanical angle (C'/E) with the rotor aligned on the D-axis is selected as the position of the hall sensor.

That is, in the flux concentrate type equipped with the arc-type permanent magnet, a point moved from the D-axis by the shift mechanical angle (C'/E) on the pitch circle diameter (PCD) is selected as the position of the hall sensor.

Here, the D-axis refers to a position where the rotor is aligned when DC current is applied to an A-phase coil, and is defined according to the number of poles/slots of the flux-concentrated motor.

In the magnetic flux-concentrated motor equipped with the arc-type permanent magnet, the D-axis and the arc-type permanent magnet are not aligned.

Here, the fact that the D-axis and the arc-type permanent magnet are not aligned means that the magnetic center line IL1 of the arc-type permanent magnet does not coincide with the D-axis.

Therefore, referring to [Table 3], in Case 1 where the reference electrical angle A is 120 degrees, the hall sensor is installed at a position moved by 15.5 degrees while the rotor is aligned on the D-axis, in Case 2 where the reference electrical angle A is 150 degrees, the hall sensor is installed at a position moved by 9.05 degrees while the rotor is aligned on the D-axis, and in Case 3 where the reference electrical angle A is 180 degrees, the hall sensor is installed by 3.05 degree while the rotor is aligned on the D-axis.

Accordingly, when [Table 1] and [Table 3] are compared, it can be seen that in the case of the flux-concentrated motor equipped with the arc-type permanent magnet, it is desirable that the hall sensor 20 is installed at a point where the third mechanical angle A' is added to the second mechanical angle B which is the angle at which the hall sensor should be moved in order to satisfy the reference electrical angle A in the flux-concentrated motor equipped with the flux concentrate type rotor having the same pole number and PCD, in which multiple bar-type permanent magnets are embedded.

In the above, the method for determining the exact installation position of the hall sensor in the flux-concentrated motor equipped with the arc-type permanent magnet 230, which has the shape and structure described in the above-described embodiments has been described, but it is apparent that as disclosed in Prior Patent 1, the case where the flux concentrate type rotor equipped with the arc-type permanent magnet in which the first curvature of the inner diameter portion and the second curvature of the outer diameter portion are the same as each other may also be applied to the method for determining the exact installation position of the hall sensor.

That is, since the third mechanical angle A' is calculated based on the PCD of the hall sensor, the shape of the arc-type permanent magnet, and the embedding angle of the arc-type permanent magnet, the method for determining the exact installation position of the hall sensor may be applied irrespective of the PCD of the hall sensor, the shape of the arc-type permanent magnet, and the embedding angle of the arc-type permanent magnet.

FIG. 21 illustrates a state in which a hall sensor 20 is installed on the bottom of a printed circuit board 300.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

The invention claimed is:

1. A flux-concentrated motor comprising:
a flux-concentrated rotor having multiple arc-type permanent magnets embedded therein, each arc-type permanent magnet comprising an inner diameter portion formed with a first curvature, an outer diameter portion formed with a second curvature, and a connecting portion for connecting an end of the inner diameter portion to an end of the outer diameter portion; and
a printed circuit board having a hall sensor for identifying the position of the arc-type permanent magnets,
wherein in a state in which the flux-concentrated rotor is D-axis aligned, the hall sensor is positioned on a pitch circle diameter (PCD) of the hall sensor in a position shifted from the D-axis by a first mechanical angle, and
the first mechanical angle is the sum of second and third mechanical angles,
the second mechanical angle is an angle at which a hall sensor moves to satisfy a reference electric angle in the flux-concentrated motor in which multiple bar-type permanent magnets are embedded in the flux-concentrated rotor having the same number of poles and PCD as the above flux-concentrated rotor, and
the third mechanical angle is an angle between the D-axis and a point of intersection between the PCD of the hall sensor and a first virtual line connecting transverse centers of the arc-type permanent magnet in the longitudinal direction of the arc-type permanent magnets.

2. The flux-concentrated motor of claim 1, wherein the third mechanical angle is determined based on the PCD of the hall sensor, a shape of the arc-type permanent magnet, and an embedding angle of the arc-type permanent magnet, and
wherein the third mechanical angle is calculated based on Equation (1) below, $$A' = \sin^{-1}\{k/(PCD/2)\} \qquad (1)$$

in Equation (1) above, A' represents the third mechanical angle, and k represents a vertical distance between the intersection points.

3. The flux-concentrated motor of claim 1, wherein the flux-concentrated rotor includes
a shaft,
a rotor core, and
the multiple arc-type permanent magnets, and
the rotor core includes
an annular ring-shaped inner diameter portion core having a shaft through-hole into which the shaft is inserted, multiple outer diameter portion cores arranged in a circumferential direction of the inner diameter portion core on an outer peripheral surface of the inner diameter portion corer, and disposed to be spaced apart from each other so that permanent magnet insertion portions for accommodating the multiple arc-type permanent magnets, and multiple bridges corresponding to the outer diameter portion cores, respectively, and arranged in the circumferential direction of the inner diameter portion core, and connecting each of the outer diameter portion cores to the inner diameter portion core, and the outer diameter portion core includes a first cutout portion positioned on a lower end.

4. The flux-concentrated motor of claim 3, wherein each of the plurality of arc-type permanent magnets satisfies at least any one of five following equations, $$A1 = k1 * C1 \ (k1 \text{ is } 0.31 \text{ to } 0.37) \tag{2}$$

$$B1 = k2 * A1 \ (k2 \text{ is } 2.9 \text{ to } 3.75) \tag{3}$$

$$B1 = k3 * E1 \ (k3 \text{ is } 1.8 \text{ to } 2.7) \tag{4}$$

$$D1 = k4 * C1 \ (k4 \text{ is } 0.62 \text{ to } 0.98) \tag{5}$$

$$M1 = (C1/D1) * A1/(C1 - D1) \ (M1 \text{ is } 2.5 \text{ or more}), \tag{6}$$

in Equations (2) to (6) above, $A1$ represents a thickness of the arc-type permanent magnet, $B1$ represents a width of the arc-type permanent magnet, $C1$ represents a first curvature of the inner diameter portion, $D1$ represents a second curvature of the outer diameter portion, and $E1$ represents a magnetization center point gap.

5. The flux-concentrated motor of claim 4, wherein the second curvature of the arc-type permanent magnet is larger than the first curvature, and wherein the connecting portion of the arc type permanent magnet includes a first straight portion connected to the end of the outer diameter portion and a second straight portion connecting the end of the first straight portion and the end of the inner diameter portion.

6. The flux-concentrated motor of claim 5, wherein ten arc-type permanent magnets are embedded in the rotor core.

7. The flux-concentrated motor of claim 6, wherein the arc-type permanent magnet is inserted into the permanent magnet insertion portion so as maintain an angle of 5 degrees to 20 degrees between a first connection line connecting a center of the inner diameter portion core and a center of the first straight portion formed on one end of the arc-type permanent magnet, and a second connection line connecting the center of the inner diameter portion core and a center of the first straight portion formed on the other end of the arc-type permanent magnet.

8. The flux-concentrated motor of claim 3, wherein the outer diameter portion core includes a first side surface which in contact with an inner diameter portion of a first arc-type permanent magnet among two adjacent arc-type permanent magnets, and a second side surface which is in contact with an outer diameter portion of a second arc-type permanent magnet positioned at an opposite side to the first side surface among the two arc-type permanent magnets, and the first cutout portion is extended to the first side surface from an end of the second side surface of the outer diameter portion core.

9. The flux-concentrated motor of claim 8, wherein the bridge includes a first side surface which is extended from the end of the first side surface of the outer diameter portion core, and connected to the inner diameter portion corer, and a second side surface which is positioned at an opposite side to the first side surface of the bridge, and connected to the inner diameter portion core, and wherein the second side surface of the bridge is positioned to be spaced from the end of the outer diameter portion of the second arc-type permanent magnet to the first side surface of the outer diameter portion core.

10. The flux-concentrated motor of claim 9, wherein a part of the first side surface of the bridge is in contact with at least a part of the connecting portion of the first arc-type permanent magnet.

11. The flux-concentrated motor of claim 10, wherein the first cutout portion is extended to the first side surface of the outer diameter portion core from a point where the first straight portion of the second arc-type permanent magnet and a lower end portion of the second side surface of the outer diameter portion core are connected.

12. The flux-concentrated motor of claim 11, wherein the second side surface of the bridge is extended from an end of the first cutout portion and connected to the inner diameter portion core.

13. The flux-concentrated motor of claim 12, wherein a portion where the second side surface of the bridge and the end of the first cutout portion are connected is positioned outside the first straight portion of the first arc-type permanent magnet in a radial direction.

14. The flux-concentrated motor of claim 12, wherein the first cutout portion and the second side surface of the bridge form an acute angle.

15. The flux-concentrated motor of claim 12, wherein the first cutout portion is parallel to at least a part of the connecting portion of the second arc-type permanent magnet.

16. The flux-concentrated motor of claim 11, wherein the outer diameter portion core further includes a second cutout portion extended outside the end of the first cutout portion in the radial direction.

17. The flux-concentrated motor of claim 16, wherein the second side surface of the bridge is extended from an end of the second cutout portion and connected to the inner diameter portion core.

18. The flux-concentrated motor of claim 17, wherein a portion where the second side surface of the bridge and the end of the second cutout portion are connected is positioned outside the first straight portion of the first arc-type permanent magnet in the radial direction.

19. The flux-concentrated motor of claim 17, wherein the second cutout portion and the second side surface of the bridge form the acute angle.

20. The flux-concentrated motor of claim 17, wherein the first cutout portion is parallel to at least a part of the connecting portion of the second arc-type permanent magnet.

\* \* \* \* \*